(12) United States Patent
Kondo et al.

(10) Patent No.: US 6,267,674 B1
(45) Date of Patent: Jul. 31, 2001

(54) IMAGE PROCESSING DEVICE

(75) Inventors: Tomohiro Kondo; Akihiko Mukaiyama; Masayoshi Kikuchi; Shin Futakawame; Kenichi Ikejiri; Katsuhiko Yamada; Kazuyuki Mukaida; Toyoji Kurose; Eiji Horita, all of Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/014,428

(22) Filed: Jan. 27, 1998

(30) Foreign Application Priority Data

Jan. 30, 1997 (JP) .................................................. 9-017224
Mar. 23, 1997 (JP) .................................................. 9-087493

(51) Int. Cl.$^7$ ..................................................... A63F 13/00
(52) U.S. Cl. ............................................................. 463/32
(58) Field of Search ................................. 463/31, 32, 33; 345/427, 473

(56) References Cited

U.S. PATENT DOCUMENTS 4,710,129 * 12/1987 Newman et al. ....................... 434/55
5,588,914 * 12/1996 Adamczyk ............................. 463/32

OTHER PUBLICATIONS

Chris Crawford, The Art of Computer Game Design, 1984, Osborne/McGraw–Hill, pp. 31–36.*

* cited by examiner

*Primary Examiner*—Peter Vo
*Assistant Examiner*—John Paradiso
(74) *Attorney, Agent, or Firm*—Finnegan, Henderson, Farabow, Garrett & Dunner, L.L.P.

(57) ABSTRACT

The present invention relates to an image processing device. Particularly, it relates to a video game device which alternately performs a shooting game and a role-playing game. The aim of the present invention is to provide an image processing device to make the operation of a character easier by limiting the movement range of the character to a certain field in a shooting game. The image processing device of the present invention places virtual objects in a virtual space formed within a computer system, proceeds a game while controlling the movement of said virtual objects according to input operations and certain rules, and displays the state within said virtual space as a screen seen from a certain viewpoint, wherein said image processing device sets a movement field of a certain shape 202 surrounding at least one of said virtual objects 100A and limits the movement range of other virtual objects 100A based on this movement field.

14 Claims, 29 Drawing Sheets

← : PATH OF COMPULSORY SCROLL

FIG.13
(1)
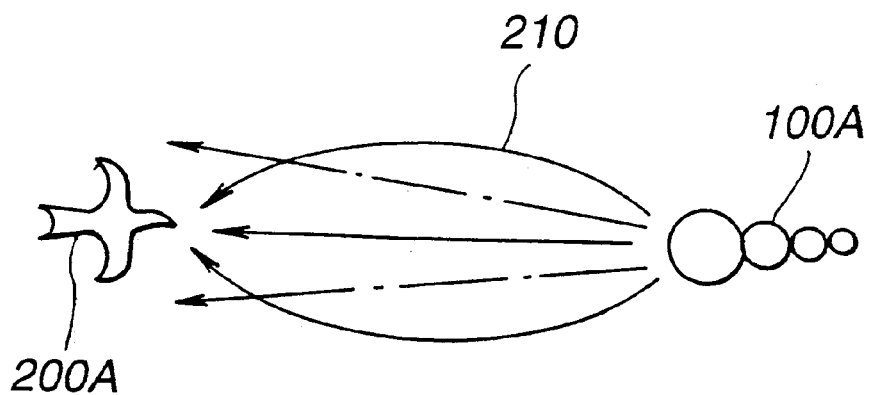
(2)
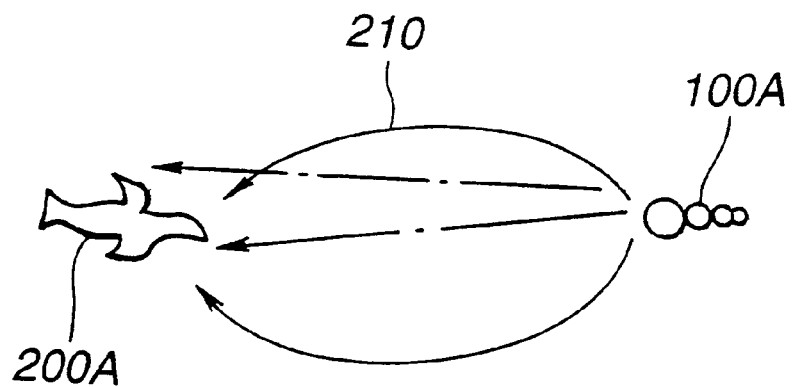

FIG.18
(1) (2) (3) (4) (5)
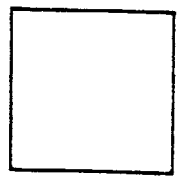  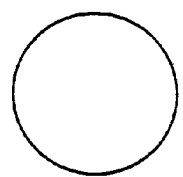 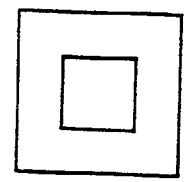 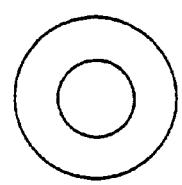

FIG.21

ORDINARY EXAMPLE
☐ POSSIBLE PLACES FOR ATTACKING
✈ PLAYER CHARACTER
▲ ENEMY CHARACTER

| | GAME SCREEN | CORRECTIVE DIAGRAM OF THE POSITION RELATIONSHIP (AS SEEN FROM THE TOP) | EXPLANATION |
|---|---|---|---|
| (1) | 100A, C4, C2, C3, 200A | ↑ PROGRESSING DIRECTION<br>▲<br>✈ | IF THE PLAYER CHARACTER IS BEHIND THE ENEMY, THE ENEMY'S RIGHT, LEFT AND BACK (TAIL) MAY BE ATTACKED, BUT THE FRONT (HEAD) MAY NOT.<br><br>EACH COLLISION CONDITION OF ENEMY<br>FRONT (HEAD) ····· OFF<br>RIGHT ····· ON<br>LEFT ····· ON<br>BACK (TAIL) ····· ON |
| (2) | C1, C3, C4 | ↑ PROGRESSING DIRECTION<br>✈  ▲ | BY MOVING TO THE LEFT OF THE ENEMY, THE FRONT (HEAD) COLLISION MAY BE ATTACKED (ON), HOWEVER, NOW THE RIGHT SIDE MAY NOT BE ATTACKED (OFF).<br><br>EACH COLLISION CONDITION OF ENEMY<br>FRONT (HEAD) ····· ON<br>RIGHT ····· OFF<br>LEFT ····· ON<br>BACK (TAIL) ····· ON |
| (3) | C2, C4, C1 | ↑ PROGRESSING DIRECTION<br>✈<br>▲ | BY MOVING IN FRONT OF THE ENEMY, THE FRONT (HEAD), RIGHT AND LEFT MAY BE ATTACKED (ON), BUT THE BACK (TAIL) MAY NOT.<br><br>EACH COLLISION CONDITION OF ENEMY<br>FRONT (HEAD) ····· ON<br>RIGHT ····· ON<br>LEFT ····· ON<br>BACK (TAIL) ····· OFF |
| (4) | C3, C2, C1, C4, C3 | ↑ PROGRESSING DIRECTION<br>a<br>d ✈ ▲ ✈ b<br>c | THE POSITION RELATIONSHIP BETWEEN THE ENEMY AND PLAYER CHARACTER, AND THE ON/OFF CONDITION OF EACH OF THE COLLISIONS<br><br>|   | ① | ② | ③ | ④ |<br>\|---\|---\|---\|---\|---\|<br>\| a \| ON \| ON \| OFF \| ON \|<br>\| b \| ON \| ON \| ON \| OFF \|<br>\| c \| OFF \| ON \| ON \| ON \|<br>\| d \| ON \| OFF \| ON \| ON \|<br>　　　C1　C2　C3　C4 |

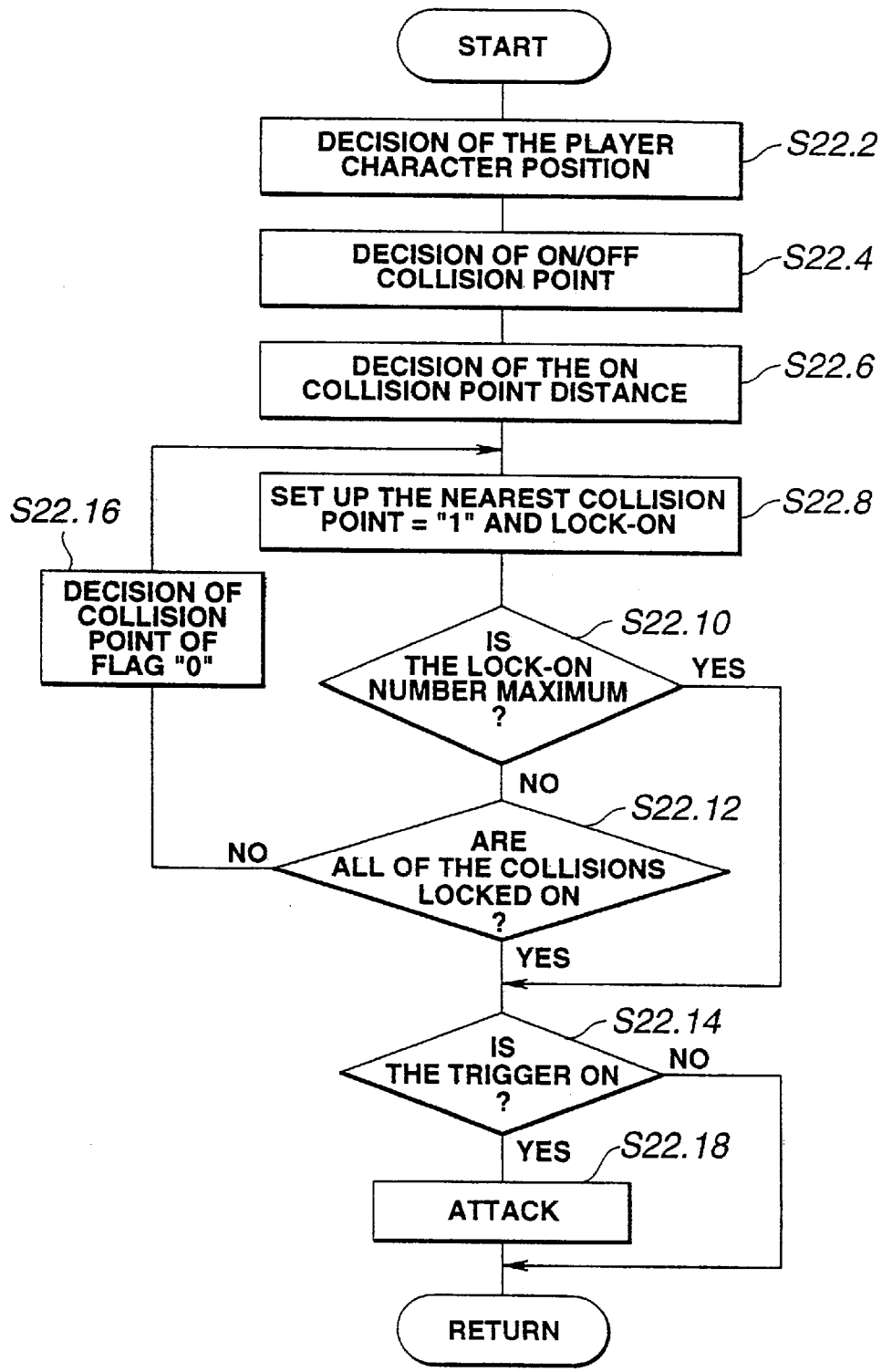

[POSITION SWITCHING]

[POSITION SWITCHING]

LIMITATION OF
THE MOVEMENT RANGE
OF THE ENEMY

IMAGE PROCESSING DEVICE

BACKGROUND OF THE INVENTION

1. Field of the Invention

The present invention relates to an image processing device. Particularly, it relates to a video game device which alternately switches and implements a role-playing game and a shooting game. More particularly, it relates to a video game device for a role-playing game including battle scenes of the player character and enemy character attacking each other within a virtual three-dimensional space.

2. Description of the Prior Art

As examples of software for video game devices, there are the likes of role-playing games and shooting games. Regarding the shooting game, for example, there is a shooting game in which a flying object (player plane) operated by the player and a flying object (enemy plane) operated by the opponent fly in each others direction freely and attack each other in a virtual three-dimensional space. On the game screen, an image of the enemy plane seen from the player plane is displayed. While watching this image on the game screen, the player controls the movement of the player plane within the three-dimensional space. In this type of shooting game which imitates a flight simulator, both the player plane and enemy plane fly freely within a three-dimensional space. Therefore, high-level operation skills are required by the player in order to capture the enemy plane on the game screen.

As a measure to solve the above, there is a game device disclosed in Japanese Patent Application No. HEI 6(1994)-58058. This game device is structured so the enemy plane may be captured more easily by limiting the movement range of the player plane within a certain range against the enemy plane.

However, upon the present inventor examining this type of game machines, the following problems were found as a result thereof:

Foremost, if the enemy plane and player plane merely compete for the results of shooting while chasing each other back and forth (e.g. damages to, or the destruction of the enemy plane or player plane), strategies of the game will become meager.

Secondly, because the movement range of the player plane is limited within a certain range, although the operation of the player plane will become easy, the action of the player plane will constantly be boring.

Thirdly, if the player plane is only controlled in order to follow or chase the enemy plane, it is not possible to select the action or weapon etc. of the player plane by predicting the action of the enemy plane or the type of weapon the enemy plane will use etc. Therefore, the game will remain boring.

Moreover, in conventional role-playing games that utilized shooting games therein, the processing of such shooting games remained boring compared to actual shooting games.

Furthermore, in shooting games that use conventional lock-on systems, when attacking a large number of enemy planes by locking on the lock-on cursor, high-level operation skills are required if there are a large number of enemy planes. Thus, there was a problem of the shooting game being too difficult for a player without high technical skills. In such case, it would be possible to set a program so that the lock-on would be simultaneously performed against a plurality of enemy planes. However, if enemy planes not seen from the player are even locked on, there is danger of the amusement of the shooting game being lost.

SUMMARY OF THE INVENTION

Accordingly, the principle aim of the present invention is to provide an image processing device in order for image processing to be effectively performed. More particularly, the aim is to provide an image processing device capable of performing a shooting game without it remaining boring.

More particularly, the aim is to provide an image processing device capable of performing a shooting game without it remaining boring while the player can easily operate the character (e.g. above flying object).

Another aim of the present invention is to provide an image processing device that does not keep the game boring even by limiting the movement range of the character within a certain three-dimensional field in a shooting game.

A further aim of the present invention is to provide a image processing device which makes the player predict the progress of the game (e.g. movement of the characters) and thereby making the shooting game more amusing by setting a means which reflects the results of such prediction.

Another aim of the present invention is to provide a role-playing game machine which includes the characteristics of a shooting game by setting a processing step of a role-playing game and a processing step of a shooting game in one game program.

In order to achieve the above aims, the image processing device of the present invention includes means for placing virtual objects within a virtual space formed within a computer system and proceeding the game while controlling the movement of said virtual objects according to input operations and predetermined rules, image displaying means for displaying the state within said virtual space on a screen seen from a certain viewpoint, and means for setting a movement field of a certain form for surrounding at least one virtual object and controlling the movement range of other objects based on this movement field. In this image processing device, wherein said virtual objects are enemy characters and player characters in a game program, it is desirable to include means for setting said movement field around the enemy character and placing the player character on the surface of this movement field. Furthermore, it is desirable that said movement field is formed of a cylindrical or hexahedral shape.

The image processing device of another embodiment relating to the present invention includes means for controlling the movement of a plurality of virtual objects placed within a virtual space formed within a computer system, image displaying means for displaying an image of the virtual object seen from a certain viewpoint on a screen, first processing means for controlling the movement of said virtual objects based on the software of a role-playing game, second processing means for setting a movement field of a certain form for surrounding at least one virtual object and implementing a shooting game program while limiting the movement range of other virtual objects based on this movement field, third processing means for outputting encounter information when a predetermined event occurs during processing of said first means, and fourth processing means for moving the movement controlling processing of said virtual objects from said first processing means to said second processing means. It is desirable that said movement field is formed of a cylindrical or hexahedral shape. Furthermore, this image processing device includes image displaying means for displaying an image including the virtual object operated by the player seen from a certain viewpoint within the virtual space. It is desirable that this image displaying means displays a virtual radar showing a relative position relationship of the virtual object operated by said player and other virtual objects.

The image processing device of yet another embodiment of the present invention includes means for placing a player character operated by the player in a virtual space formed within a computer system and proceeding a shooting game with enemy characters while controlling the movement of said player character according to input operations and predetermined rules, image displaying means for displaying the state within said virtual space as the screen seen from a certain viewpoint, means for setting a singular or a plurality of collision points to the player character and/or enemy characters, and means for setting a lock-on cursor in the order from the collision point nearest to said collision point set to the characters to be attacked. In this image processing device, it is desirable that within the enemy character's collision points, said lock-on cursor only be set to the collision points on the player character's side.

The image processing device of yet another embodiment of the present invention includes moving means for moving the moving character between a plurality of characters placed within a virtual space formed within a computer system via plurality of certain routes, moving route deciding means for deciding a certain moving route among said plurality of moving routes, predicting means for predicting the certain route among said plurality of routes, and character position setting means for setting the position of said character in correspondence with such prediction. It is desirable that this image processing device includes image processing means for displaying a certain image in correspondence with said results of the prediction. Furthermore, it is desirable that this image processing device includes position setting means for dividing the position in which said characters are supposed to be set into a plurality of areas, and in correspondence with the prediction results of machine gun predicting means, placing said characters in a position within said plurality of areas.

The image processing device of yet another embodiment of the present invention includes means for placing a virtual object within a virtual space formed within a computer system and proceeding the game while controlling the movement of said virtual object according to input operations and predetermined rules, image displaying means for displaying the state within said virtual space as a screen seen from a certain viewpoint, and means for alternately switching and processing a role-playing game and a shooting game, wherein during the processing of a role-playing game program, the movement range of said virtual object may be set at the player's discretion, and wherein during the processing of a shooting game program, the movement range of this virtual object is limited to a certain field.

BRIEF DESCRIPTION OF THE DRAWINGS

FIG. 13 is a diagram showing a situation wherein the player character is positioned in front of and facing the enemy character and bullets are being fired from the enemy character toward the player character.

FIG. 18 is a model diagram showing when the cursor is changed.

FIG. 21 is an explanatory diagram showing the situation in which the lock-on is occurring to the collision point in the viewpoint field of the virtual camera or which may be seen from the player.

FIG. 22 is an example of a flowchart of the lock-on function.

DESCRIPTION OF THE PREFERRED EMBODIMENT

Next, embodiments of the present invention will be explained in an example of a video game device. This video game device performs a new type of game program which combines a shooting game and a role-playing game, and further performs the processing step of a role-playing game and the processing step of a shooting game respectively. This game is performed within a virtual three-dimensional space defined in a game program.

In the processing of a role-playing game, the character operated by the player (player character) moves on a certain movement map. The screen scrolls (meaning the screen moves in a fixed direction or the background moves within the screen) in the direction of the player character's movement on the game screen, and an image of the background etc. including the player character is displayed on the game screen. Within the virtual space, main characters such as the player character and enemy character are formed of polygons and the background is formed of a scroll screen. A virtual camera is set in a certain point within the three-dimensional space, and the image seen from this virtual camera is displayed on the game screen.

If a certain encounter information occurs when the player character is moving on the movement map, the processing step of a role-playing game is transferred to the processing step of a shooting game. Encounter information used herein shall mean information or signals that order a game scene (e.g. role-playing scene) to transfer to another game scene (e.g. shooting scene). This encounter information is made to correspond with the encounter flag set in the RAM, thereby enabling the distinction of whether or not encounter information exists according to the "0" or "1" of the encounter flag.

Figure 1:
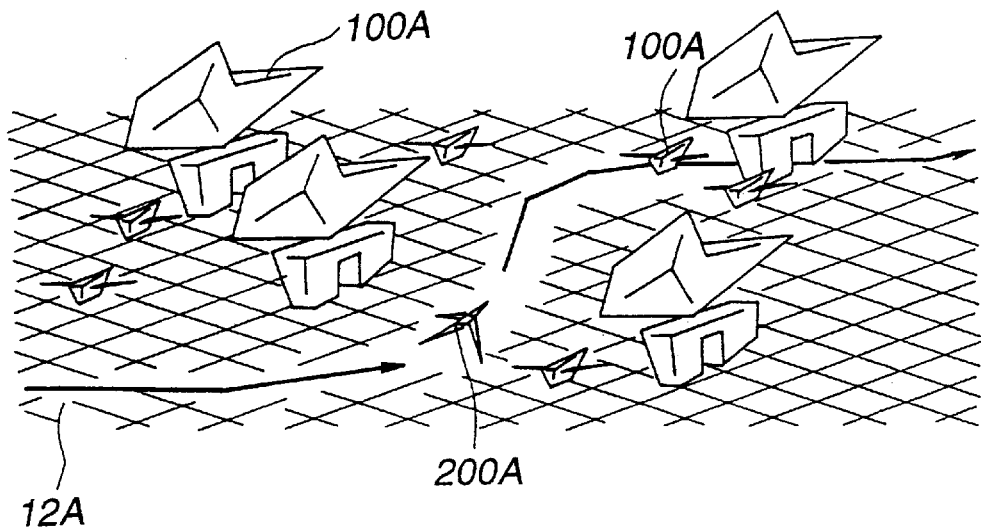
FIG. 1 is a scene in which the player character is moving on a moving map during the performance of a role-playing game program.

FIG. 1 shows a scene in which the player character 200A (image of a dragon) operated by the player is moving on the movement map at the time of performing the role-playing game. 12A is the locus of the flight path of player character 200A. 100A is an enemy character existing on the movement map. The player may freely operate the direction key of the controller, as will be explained hereafter, and freely set the flight direction and flight range of the player character 200A within the virtual space. Furthermore, there are situations wherein the enemy character will not be displayed on the movement map.

Figure 2:
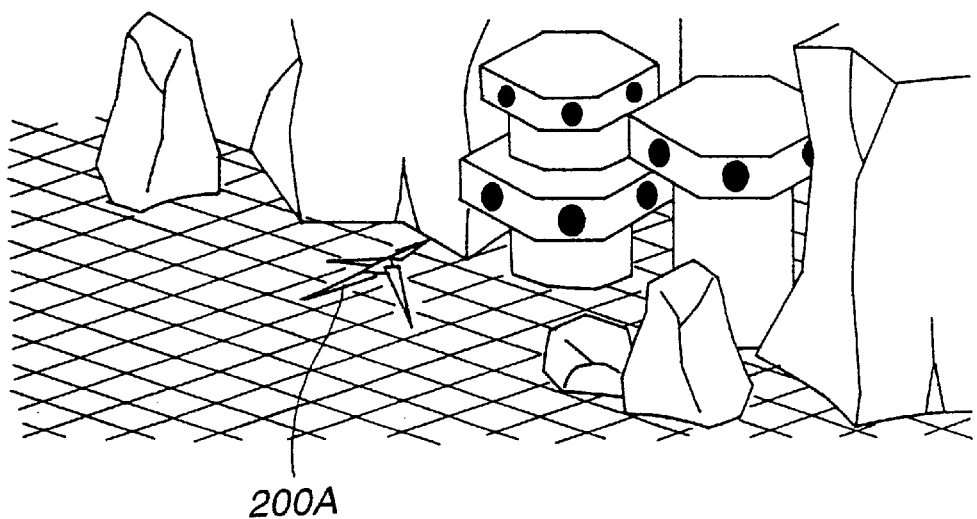
FIG. 2 is a battle scene at the time of performing the shooting program.
Figure 3:
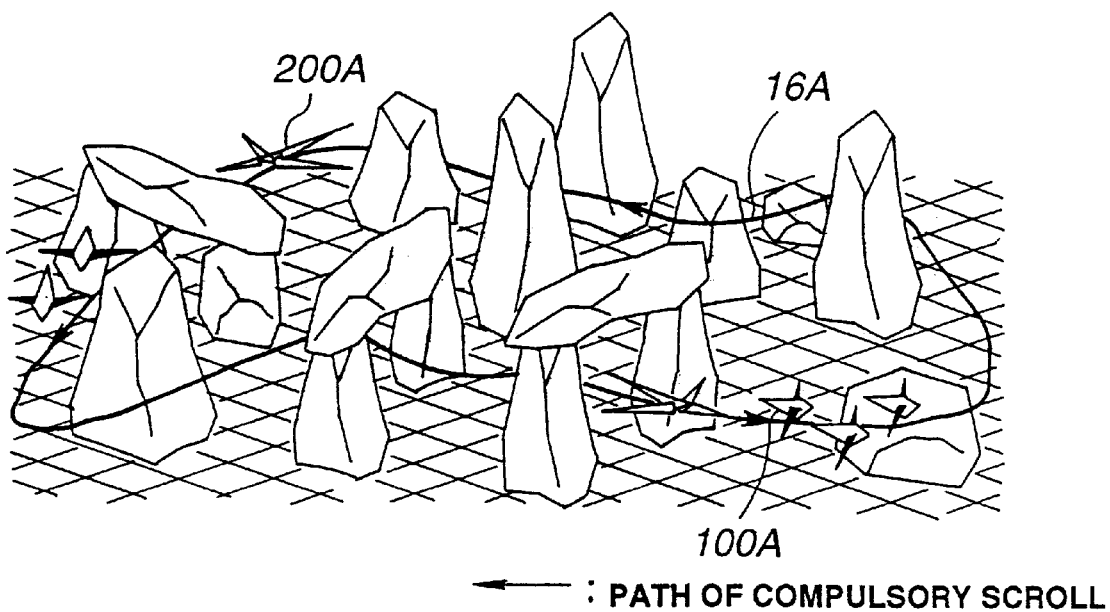
FIG. 3 is a battle scene of the player character and enemy character.

FIGS. 2 and 3 are battle scenes at the time of performing the shooting program. FIG. 2 is a battle scene with an enemy character that does not move, and FIG. 3 is a battle scene with an enemy character 100A that moves. In the battle scene shown in FIG. 3, a path 16A is set on the field and the dragon and enemy character move along this path 16A by compulsory scroll.

Although no path exists in FIG. 2 and compulsory scroll will not be performed, on the other hand, the player character 200A may fly freely around the enemy character. This battle scene is continued until the battle between the enemy character 100A and player character 200A is completed.

If an event (e.g. the player character 200A encounters the enemy character 100A) occurs while moving on the movement map, the encounter flag is set to "1" and proceeds to a battle scene. In this battle scene, real-time shooting is possible. In the battle scene of FIG. 3, a game which simulates position taking among a plurality of enemy characters and the player character 200A is possible, as will be explained hereafter. Position taking used herein shall mean such acts of the player character 200A escaping to a safe position in advance by predicting the attacking direction of the enemy character 100A, or the enemy character chasing the player character 200A, thus, any acts in which the enemy character 100A or player character 200A taking an advantageous position for battling.

As mentioned above, the transfer from the role-playing scene to the shooting-scene starts at the time encounter information occurs. Let it be assumed that encounter information occurred when "1" has been set in the encounter flag.

Figure 4:
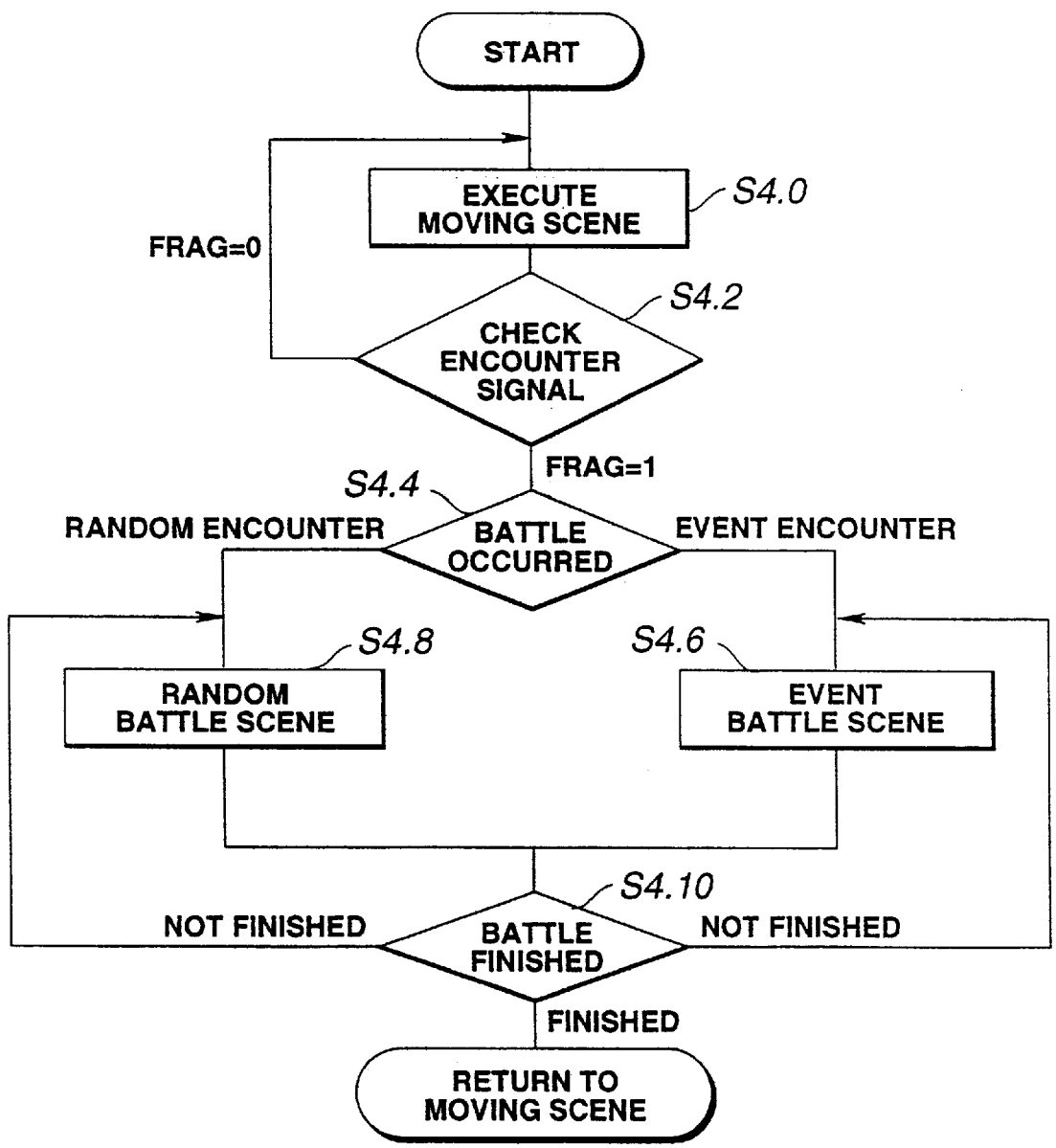
FIG. 4 is a flowchart showing the relationship between role-playing processing (moving map processing) and shooting game processing (battle scene processing).

FIG. 4 is a flowchart showing the relationship between role-playing game processing (movement map processing) and shooting game processing (battle scene processing). This flowchart is performed by the CPU of a video game device having a hardware structure which will be explained hereafter.

Foremost, when the game begins, a movement scene (e.g. scene of FIG. 1) as one scene of a role-playing game is displayed on the game screen (S4.0).

In S4.2, the encounter flag is checked, and proceeds to a battle scene processing if the encounter flag is "1." If the encounter flag is "0," it returns to S4.0. This encounter flag is a flag for proceeding to the battle scene, and a shooting scene is proceeded in the respective battle scenes. These battle scenes may be made the same or different. When the above encounter flag is set to "1" or a random encounter occurs, it proceeds to S4.8, and when an event encounter occurs, it proceeds to S4.6.

This event encounter is caused when a certain event occurs, such as when the player character 200A encounters the enemy character 100A on a flight path as shown in FIG. 1. Furthermore, when displaying the enemy character 100A on the movement map, the player may control the flight direction of the player character 200A in order to avoid the player character 200A from encountering the enemy character 100A. On the other hand, a random encounter is caused when a certain condition materializes or occurs, such as when a certain time has elapsed or when the game score reaches a certain value.

In S4.10, it is judged whether or not the battle scene has finished. It returns to the movement scene if the battle is finished, and returns to the battle scene if the battle is not finished.

In the event battle scene (S4.6) and random battle scene (S4.8), a real-time shooting game in which the player character 200A and enemy character 100A start attacking or avoid being attacked etc. is reproduced. As an example of this battle scene, for example, there are the types shown in FIGS. 2 and 3. In FIG. 3, by compulsorily making the player character 200A fly along a certain path (route) 16A, the player may easily control the player character 200A in the processing strep of a shooting game. In other words, as the player character is compulsorily made to fly on the path 16A, the player may concentrate on the shooting game. Furthermore, as the path 16A is made to adequately curve and pass through various backgrounds (mountains, valleys), the path 16A is therefore not boring. Defining this type of path 16A is possible by a certain coordinate point passing through a world coordinate system in a virtual three-dimensional space.

The battle scene is over when all of the enemy characters 100A are eliminated, when the player character 200A is eliminated, or when the game is finished compulsorily (reset), etc. The destruction of the enemy character 100A and player character 200A is performed as follows. The collision between the polygons forming the enemy character 100A or player character 20A and the polygons forming the virtual weapons (e.g. bullets) is judged, and when this judgment is affirmed, the shape of the polygons forming the enemy character 100A or player character 200A is modified, thereby causing changes in the character condition value. When this condition value exceeds a certain value, the enemy character 100A and player character 200A are eliminated.

Incidentally, in the flowchart shown in FIG. 4, S4.0 and S4.2 are equivalent to the processing step for a role-playing game, and the processing on and after S4.4 are equivalent to the processing step of a shooting game.

Figure 5:
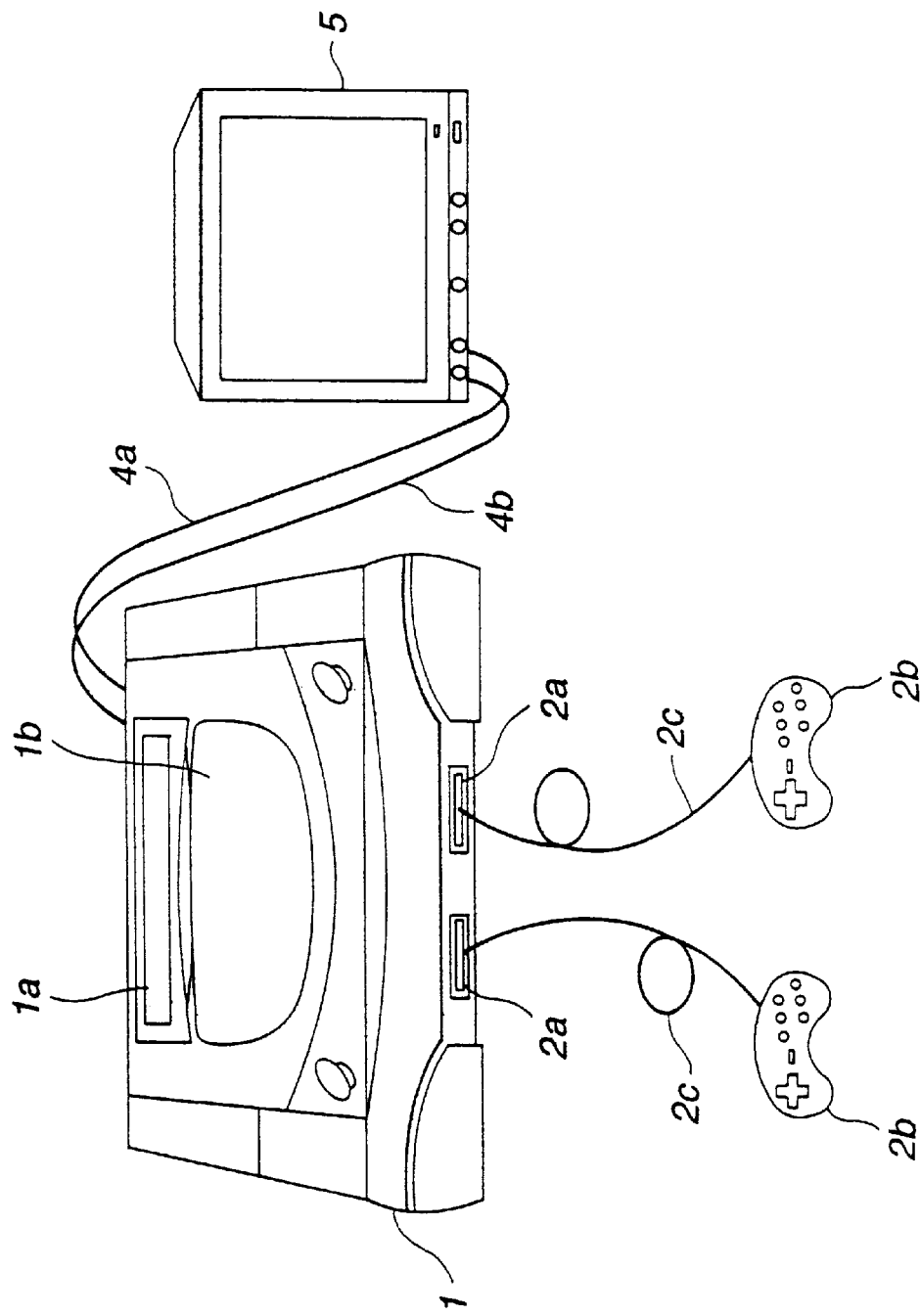
FIG. 5 is an external perspective diagram of the hardware relating to the embodiment of the present invention.

Next, the structure of the game device hardware will be explained. FIG. 5 is an external perspective view of the game device. In this diagram, numeral 1 is the main game device. At the front of this main game device 1, a pad 2b for operation is connected to a connector 2a via a cable 2c. Moreover, at the top portion of this main game device 1, a cartridge interface (cartridge I/F) 1a for connection to a ROM cartridge is provided. Similarly, a CD-ROM drive 1b for reading a CD-ROM is provided at the top portion of the main game device 1. At the back of the main game device 1, a video output terminal and an audio output terminal (not shown) are provided. This video output terminal is connected to a video input terminal of a TV receiver 5 via a cable 4a. On the other hand, the audio output terminal is connected to an audio input terminal of the TV receiver 5 via a cable 4b. In this type of game device, by operating the pad 2b, a user may play a game by operating the player character while watching the image displayed on the TV receiver 5.

Figure 6:
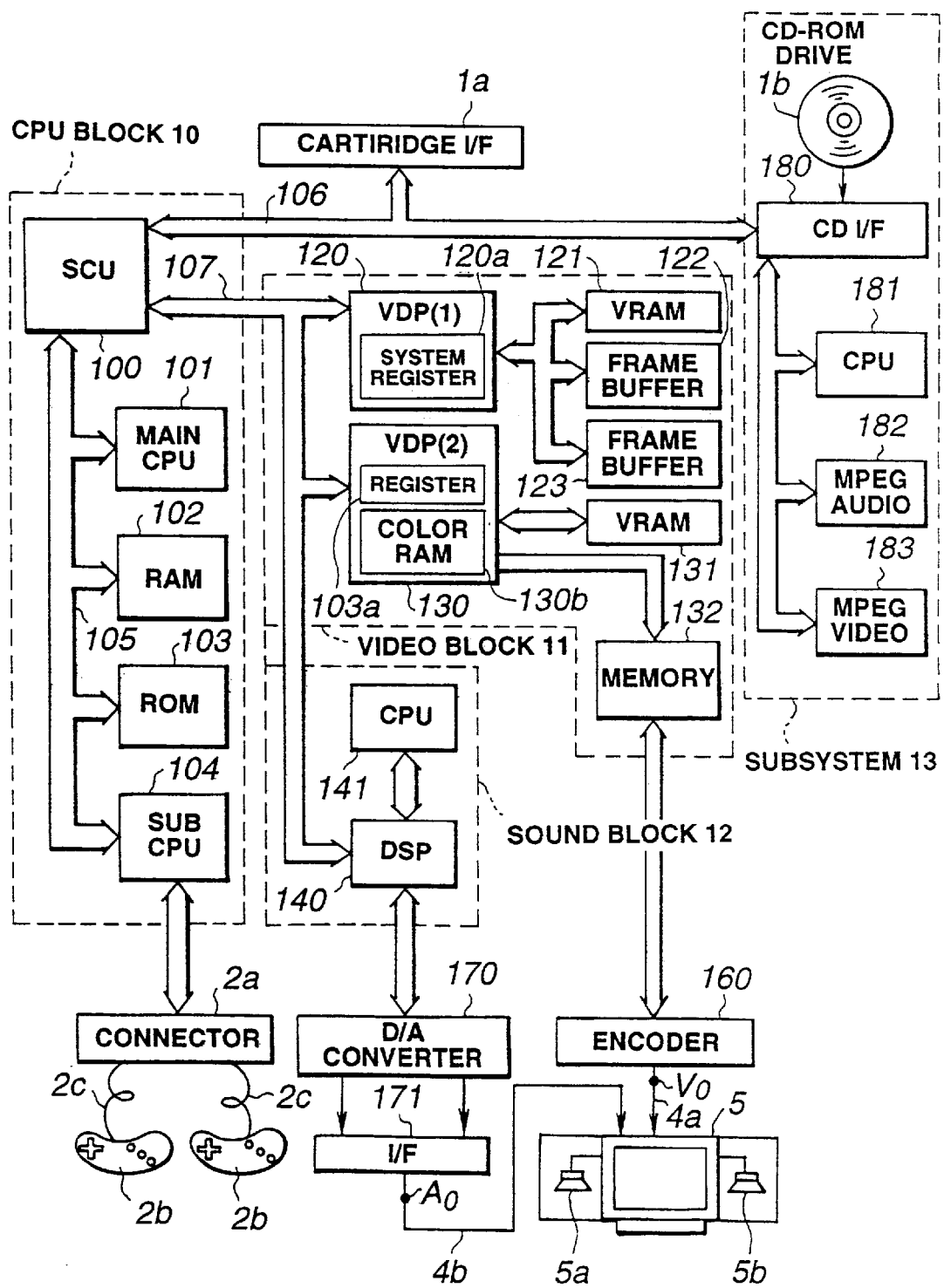
FIG. 6 is a functional block diagram of this hardware.

FIG. 6 shows a functional block diagram of the game device hardware. The main game device is structured of a CPU block 10 for controlling the entire device, a video block 11 for controlling the display of a game screen, a sound block 12 for generating sound effects or the like, a subsystem 13 for reading a CD-ROM, and other elements.

The CPU block 10 is structured of an SCU (System Control Unit) 100, a main CPU 101, a RAM 102, a ROM 103, a cartridge I/Fla, a sub CPU 104, a CPU 105, and other elements.

The main CPU 101 is for controlling the entire device. This main CPU 101 comprises on the inside an operating function similar to a DSP (Digital Signal Processor) and is able to perform application software at high speeds. Furthermore, based on peripheral data received from the sub CPU 104, the main CPU 101 controls image of, for example, rotational conversion and perspective conversion of characters in the virtual space and performs processing to display such image on the screen.

The RAM 102 is used as a work area of the main CPU 101. The ROM 103 has, for example, an initial program for initialization processing written thereon. The SCU 100 is able to perform smooth input and output of data between, for example, the main CPU 101, VDPs 120 and 130, and the DSP 140 by controlling buses 105, 106 and 107.

Moreover, the SCU 100 comprises a DMA controller therein and is capable of directly transmitting character data (polygon data) during a game to the VRAM 121 within the video block 11. By this, performing a game program at a high speed is possible. The cartridge I/Fla is for reading in the game program supplied in a form of a ROM cartridge to the RAM 102.

The sub CPU 104 is the so-called SMPC (System Manager & Peripheral Control) and is provided with a function of automatically recognizing the type of peripheral connected to the connector 2a and gathering peripheral data or the like in a communication format according to the type of peripheral. This connector 2a may be connected to an optional peripheral among a pad, a joystick, a keyboard and the like.

The video block 11 comprises a first VDP (Video Display Processor) 120 which overwrites characters composed of polygon data onto the background and generates image, and a second VDP 130 which performs drawing of background image, as well as synthesis and clipping of polygon image data and scroll image data based on priority.

The first VDP 120 has a built-in system register 120a and is connected to the VRAM 120 and frame buffers 122 and 123. Polygon image data displaying the characters are sent to the first VDP 120 via the main CPU 101, and is drawn on the frame buffer 122 (or 123) for drawing, for example, in a 16 bits/pixel or 8 bits/pixel format. Data drawn on the frame buffer 122 (or 123) is sent to the second VDP 130 at the time of the displaying mode.

Like this, the frame buffer uses buffers 122 and 123 and has a double buffer structure which switches between drawing and display for each frame. Moreover, regarding information for controlling the drawing, the first VDP 120 controls the drawing and display according to the instructions set in the system register 120a of the first VDP 120 from the main CPU 101 via the SCU 100.

On the other hand, the second VDP 130 has a built-in register 130a and a color RAM 130b, and is connected to a VRAM 131. Furthermore, the second VDP 130 is connected to the first VDP 120 and the SCU 100 via the bus 107, as well as to the video output terminal vo via the memory 132 and the encoder 160. The video input terminal of the TV receiver 5 is connected to the video output terminal vo via the cable 4a.

Scroll image data is defined in the VRAM 131 and the color RAM 130b from the main CPU 101 via the SCU 100. Information for controlling a display screen is similarly defined in the register 130a. Data defined in the VRAM 131 is read-out according to the contents set in the register 130a from the second VDP 130, and is converted to image data of each scroll image displaying the background against the character. The priority of image data of each scroll image and image data of the polygon data sent from the first VDP 120 is decided according to the setup in the register 130a, whereby being synthesized into a final displaying image data.

If this displaying image data is in a palette format, color data defined in the color RAM 130b is read-out and displaying color data is generated. Moreover, if the displaying image data is in an RGB format, displaying image data itself will be the displaying color data. This displaying color data is output to an encoder 160 after being stored in a memory 132. The encoder 160 generates image signals by adding synchronization signals or the like to this image data and supplies the same to the video input terminal of the TV receiver 5 via the video output terminal Vo. Like this, a game image is displayed on the screen of the TV receiver 5.

The sound block 12 comprises a DSP 140 for synthesizing sound according to a PCM format or a FM format, and a CPU 141 for, for example, controlling the DSP 140. Sound data generated by the DSP 140 are converted to two-channel signals by a D/A converter 170 and supplied to an audio output terminal Ao via an interface 171 thereafter. This audio output terminal Ao is connected to the audio input terminal of the TV receiver 5 via the cable 4b. Therefore, sound signals are input into an audio amplification circuit (not shown) from the audio input terminal of the TV receiver 5 via the audio output terminal Ao and the cable 4b. Sound signals amplified in the audio amplification circuit drives the speakers 5a and 5b built inside the TV receiver 5.

The subsystem 13 is structured of a CD-ROM drive 1b, a CD-I/F 180, a CPU 181, an MPEG-AUDIO portion 182, MPEG-VIDEO portion 183, and other elements. This subsystem 13 has functions, for example, to read-in application software supplied in a CD-ROM form and to reproduce animation. The CD-ROM drive 1b is for reading-in data from a CD-ROM. The CPU 181 performs processing such as for controlling the CD-ROM drive 1b and correcting errors in the read-in data. Data read-in from a CD-ROM are supplied to the main CPU 101 via the CD-I/F 180, the bus 106 and the SCU 100, and are used as application software.

Furthermore, the MPEG AUDIO portion 182 and MPEG VIDEO portion 183 are devices for restoring data which are compressed in MPEG (Motion Image Expert Group) standards. If the restoration of the MPEG compressed data written on a CD-ROM by using the MPEG AUDIO portion 182 and MPEG VIDEO portion 183 is performed, reproduction of animation will become possible.

The game device explained herein is structured to perform processing so as to simulate an easy operation for the player while maintaining the amusement of the game. Various workings of this game machine will be explained hereafter.

Figure 7:
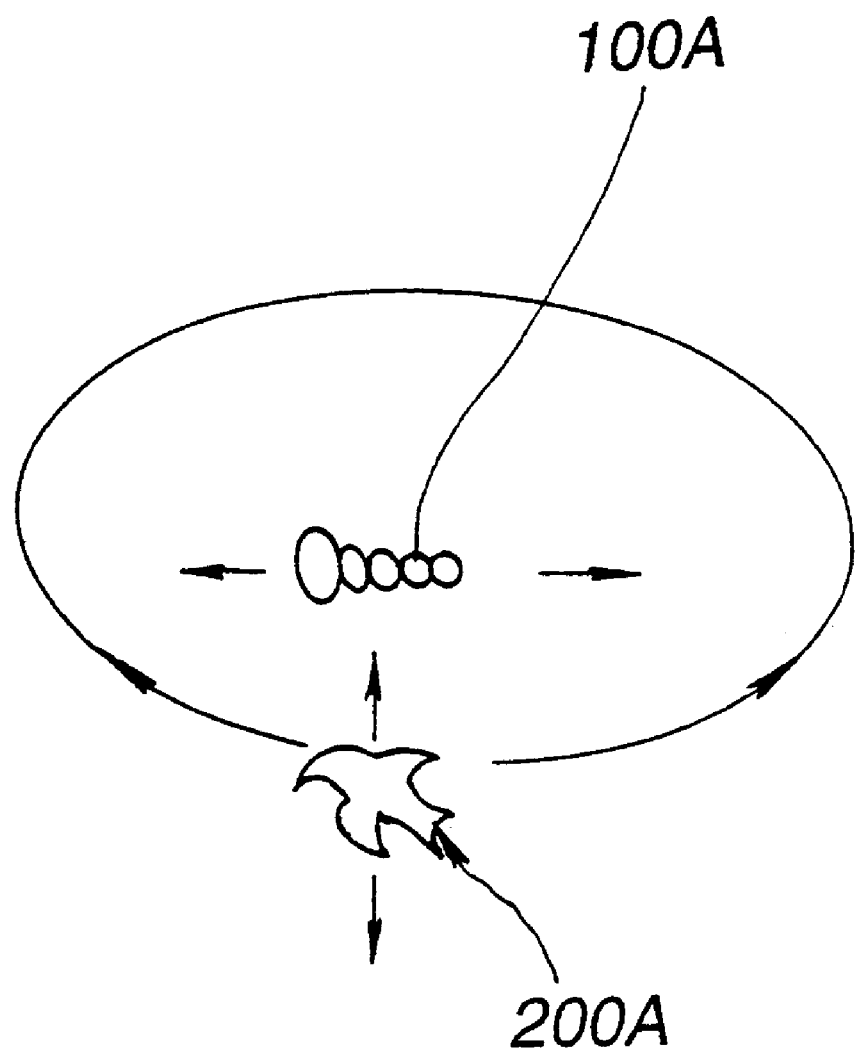
FIGS. 7 and 8 are diagrams showing the position relationship between the player character and enemy character in a battle scene.
Figure 8:
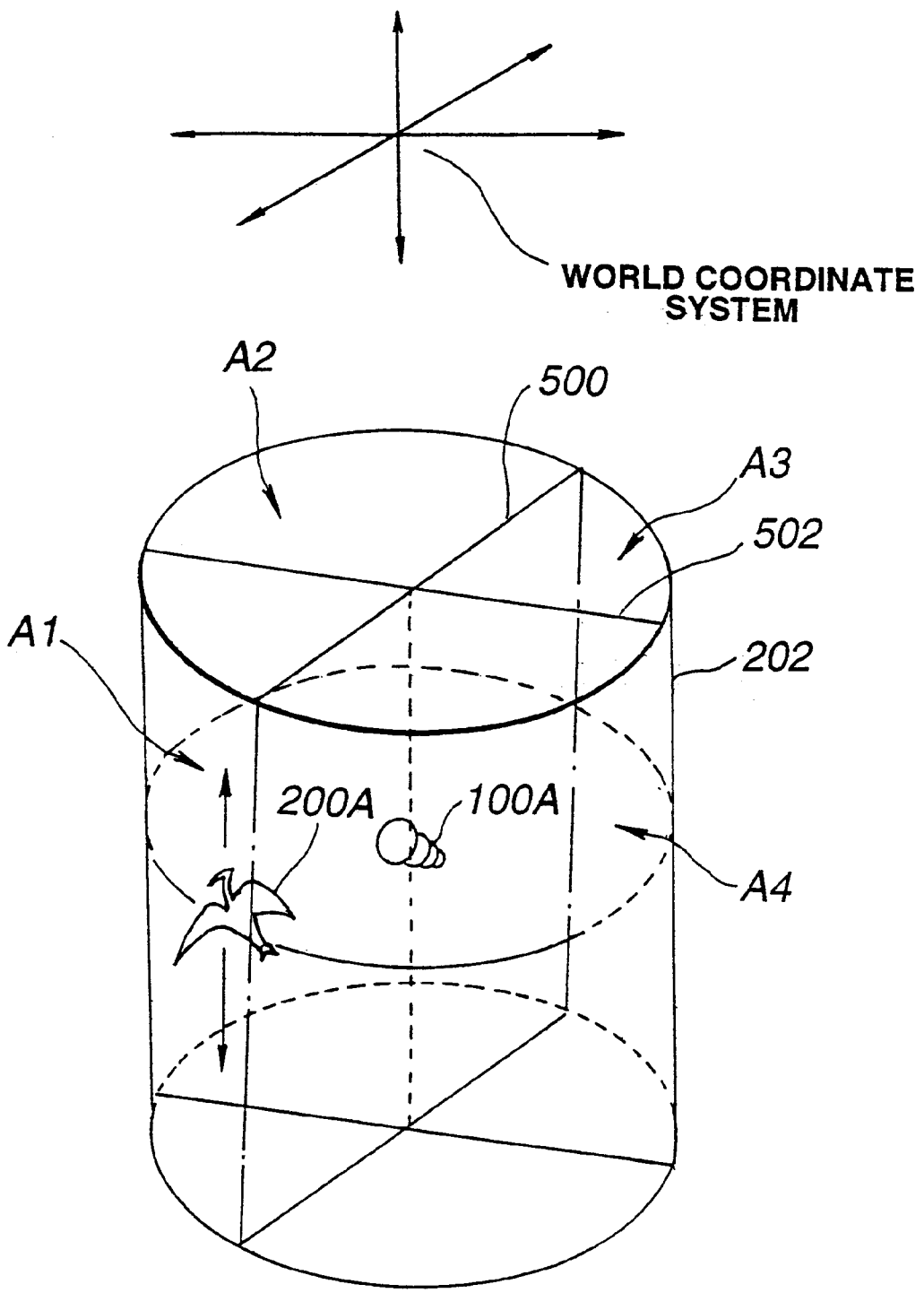

FIGS. 7 and 8 are diagrams showing the position relationship of the player character 200A and enemy character 100A in the battle scene shown in FIG. 3.

The player character 200A may move around the enemy character 100A as well as move in an upward and downward direction. The player character 200A moves along the arrow of path 16A within the virtual space as shown in FIG. 3. The player character 200A may move around the enemy character while moving up and down in accordance with the movement of the enemy character 100A.

That is, FIG. 8 specifically shows the movement range of the player character 200A, showing that the player character 200A may move within the cylindrical field (hereinafter referred to as the "movement area") 202 set around the enemy character 100A.

Moreover, it may be set so that the enemy character 100A is to move around the player character 200A. Furthermore, in FIG. 3, it may also be set so the enemy character 100A is to move along the arrow of the path 16A during a battle scene.

The enemy character 100A attacks the player character 200A in a variety of ways either randomly, or in a certain pattern. The player predicts the movement of the enemy character 100A and operates the player character 200A within the movement area 202, and further attacks the enemy character 100A while avoiding the attacks made by the enemy character 100A. If the player character 200A is able to fatally damage the enemy character 100A within a certain time, the game is won, whereas if the player character 200A receives fatal damage, the game is over.

By setting a movement area 202 such as this, there are the following advantages. By limiting the movement range of the player character 200A within this field, the player character 200A may be easily placed in the vicinity of the enemy character 100A. Moreover, the player character 200A may take an advantageous position against the enemy character 100A.

Figure 34:
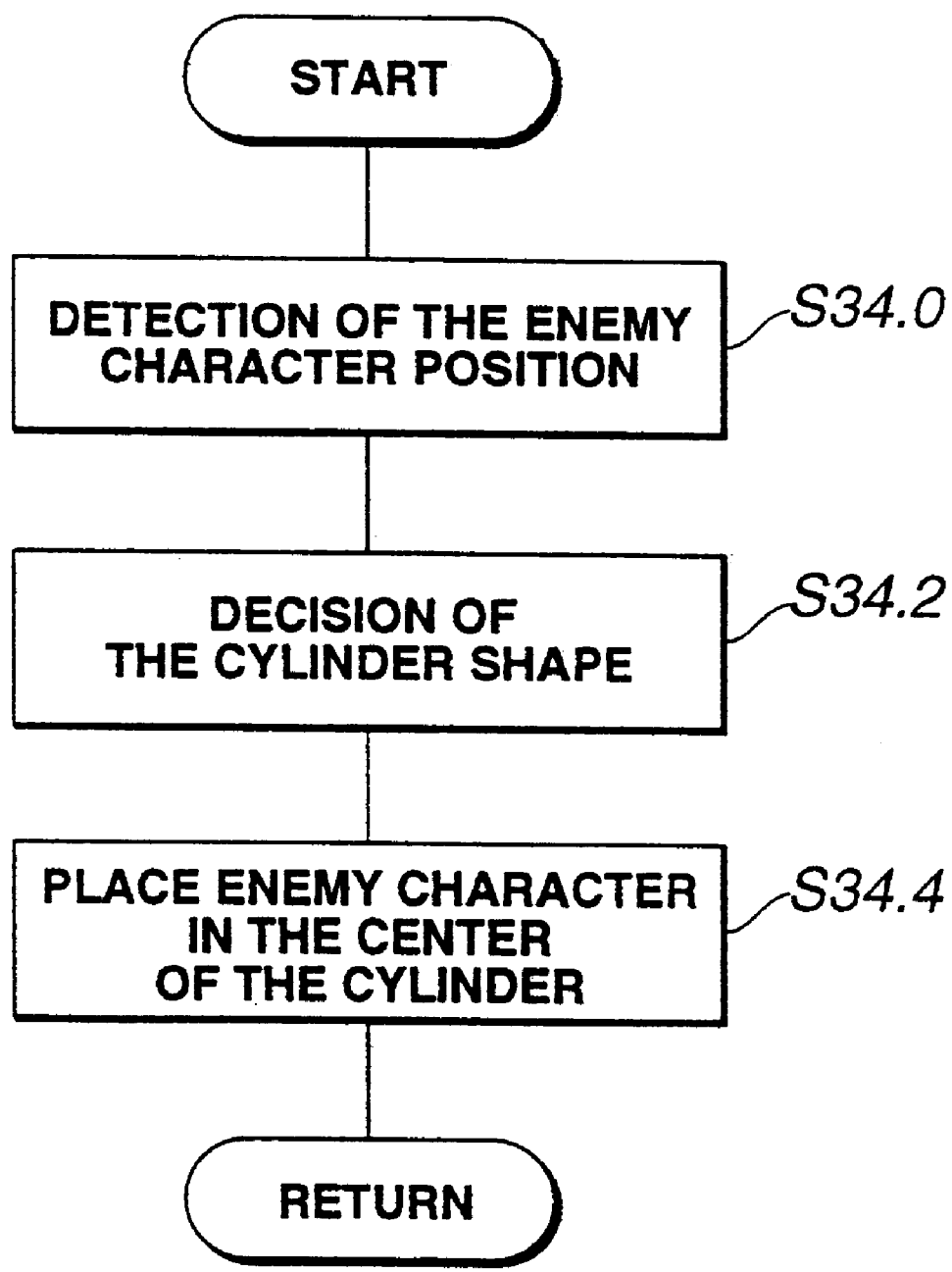
FIG. 34 is a flowchart for placing the movement area around the enemy character.

FIG. 34 is a flowchart for controlling the placement of the player character 200A and is repeatedly performed by the CPU when a battle scene like the one shown in FIG. 3 begins until such battle scene is finished. In S34.0, the position of the enemy character 100A is detected. In S34.2, the shape (e.g. diameter and height of the cylinder) of the movement area 202 is decided. In S34.4, the movement area is set so that the enemy character 100A is placed in the center of the movement area 202. In other words, the movement area 202 is formed with the enemy character in the center and is moved along the path 16A (c.f. FIG. 3) together with the enemy character 100A.

Figure 9:
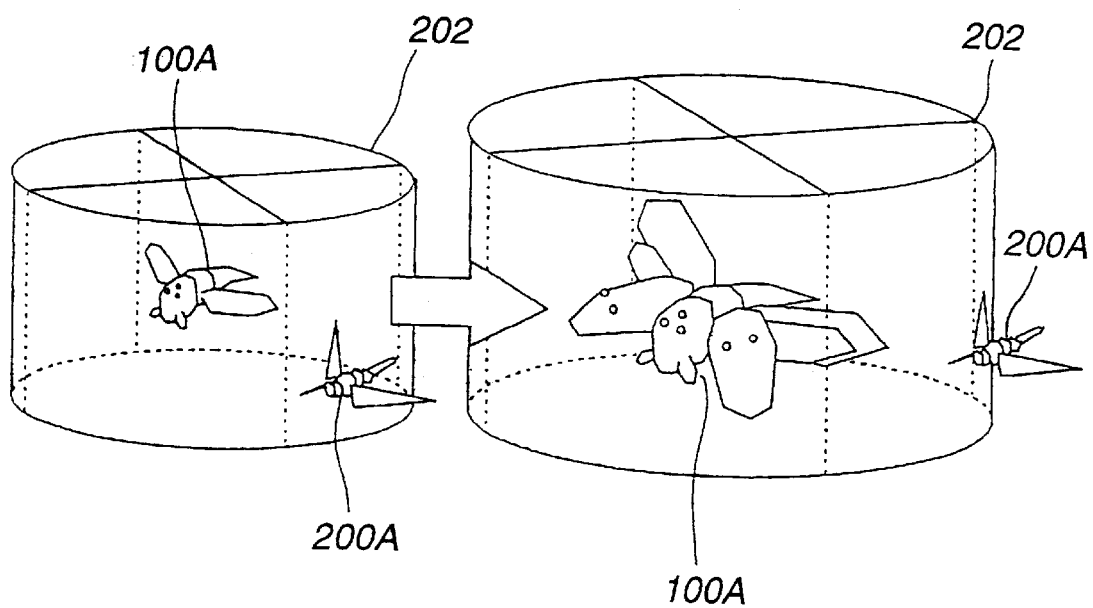
FIG. 9 is a perspective diagram showing the condition of changing the radius of the movement area in correspondence with the changes in the size of the enemy character.

The decision of the radius and height of the movement area 202 in S34.2 is performed as follows. For example, as shown in FIG. 9, the radius of the movement area 202 is enlarged when the enemy character becomes a large form (polygon). Therefore, the CPU reads-in each vertex coordinates of polygons forming the enemy character within the virtual space and decides the size of the enemy character 100A from the difference between the maximum coordinates and minimum coordinates in each direction of XYZ. It is further possible to have the form of the movement area 202 certain for each enemy character 100A.

By operating the pad 2b, the player may continuously move the player character 200A in a direction toward the height of, or the circumferential direction of the cylinder of the movement area 202 with a cylindrical shape. Especially, by dividing the cylindrical movement area 202 in a plurality of blocks (e.g. four blocks), the operation of the player character 200A could be made easy when moving the player character 200A in a circumferential direction of the cylinder. When dividing the movement area 202 into four blocks, such division may be made by two rectangular surfaces (500 and 502) which directly cross each other. Moreover, these rectangular surfaces are for showing how to divide the field 202, and such rectangular surfaces are not actually provided.

Figure 35:
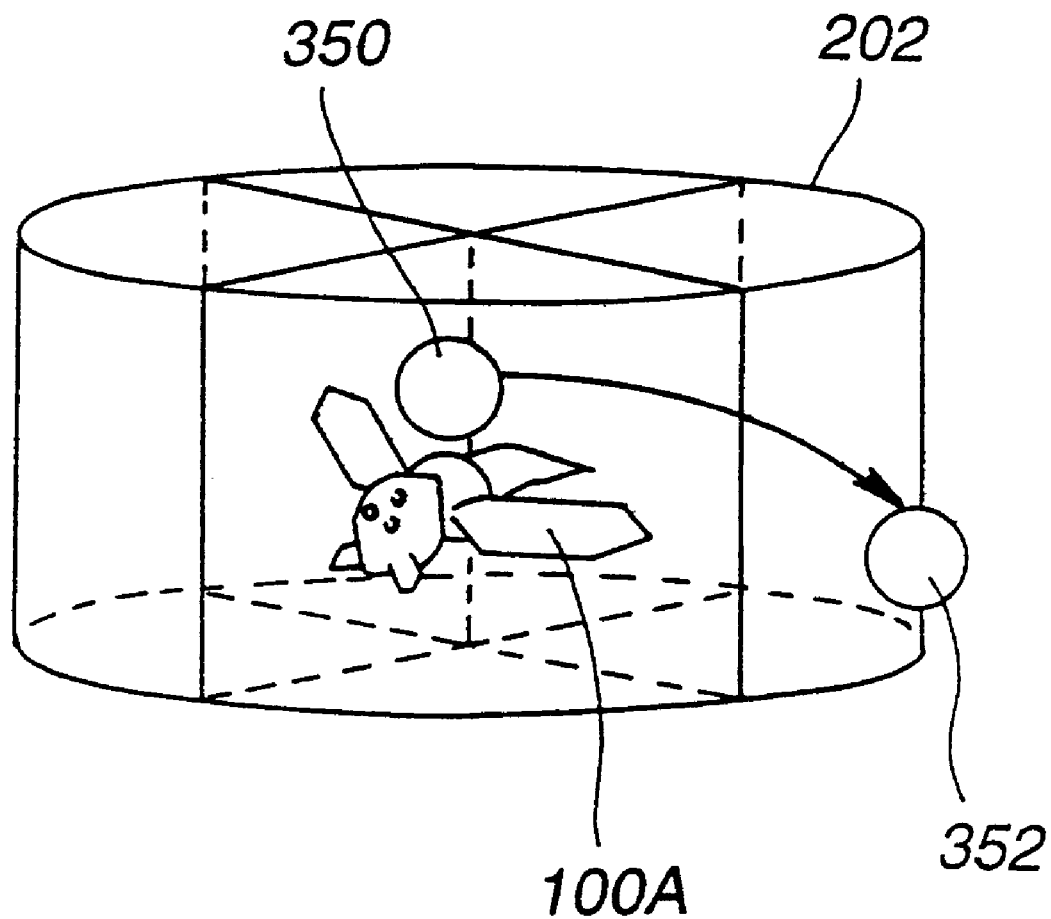
FIG. 35 is a diagram explaining the movement of the player character in the movement area of a cylindrical shape.

The movement of the player character 200A may be positioned in the center of each block. This point is explained with reference to FIG. 35. When moving the player character 200A from a certain block composing the cylindrical movement area 202 to another block, it shows that the player character 200A will move from a certain point 350 within the block to a certain point 352 within another block. In such case, after having moved to a certain point, the player character 200A may either move up, down, left or right along the surface of the block or be designed to not move at all within such block.

The movement of the player character 200A between the blocks, for example, is as follows. The four divided blocks are made to correspond with the cross key. For example, when the upward direction key of the cross key is operated, the player character 200A is moved to a block positioned in the progressing direction of the player character 200A. When the downward direction key is operated, the player character 200A is moved to a block in the back, when the right key is operated, is moved to the right block, and when the left key is operated, is moved to the left block. Moreover, the upward and downward keys may be designed to correspond to the movement in the direction toward the height of the cylindrical movement area 202.

The player character 200A may be designed to move not only on the surface of the movement area 202, but also on the inside as well.

The main CPU reads-in the game program supplied from a medium such as a cartridge I/F or a CD-ROM. In accordance to this game program, a bullet is fired from the enemy character 100A toward the player character 200A. If the player character 200A is hit with this bullet, an image of the player character being eliminated or destroyed generated. Whereas if the player character 200A is not hit with this bullet, an image which shows the player character being damaged is not generated.

Figure 10:
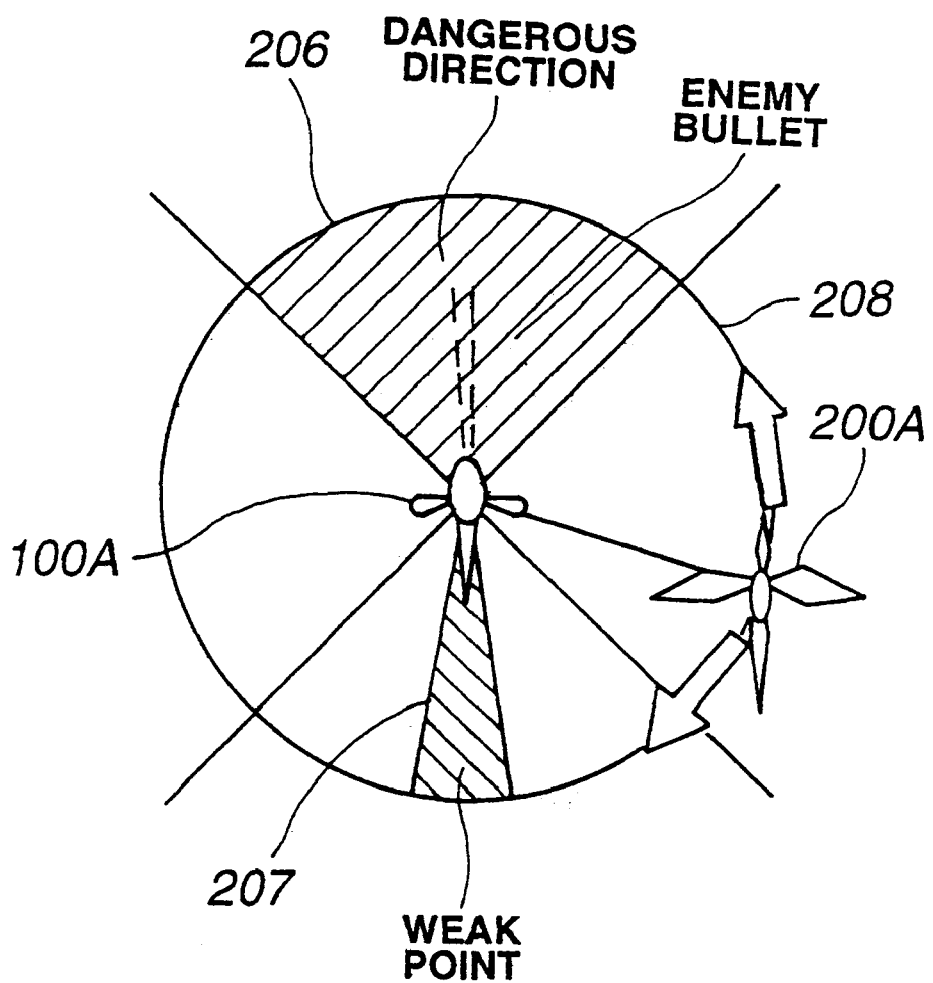
FIG. 10 is equivalent to a plan view of the movement area and is an explanatory diagram showing the situation wherein the bullets from the enemy character are being fired separately in the four (4) respective blocks of front, back, left and right.

FIG. 10 is a model diagram of such image. FIG. 10 is equivalent to a plan view of FIG. 8. Firing of the bullets from the enemy character 100A is separately performed in each of the four blocks of front, back, left and right (any one of blocks A1 through A4 of FIG. 8).

FIG. 10 shows the situation where a bullet is being fired within the block 206 by the enemy character 100A. If the player character 200A is within this block, the possibility of being hit will become high. On the other hand, if the player character 200A is within the block 208, there is no possibility of being hit. The enemy character 100A has a virtual weak point field (weak point collision) 207. By moving the player character 200A around to the weak point collision 207, an effective attack against the enemy character 100A may be performed.

As mentioned above, the firing direction of bullets from the enemy character is set for each of the four blocks. The bullet is either fired by drawing a straight line in a certain direction or by drawing a certain route. Accordingly, the player may predict the direction of the fired bullet and be prepared.

As for the type of bullets, there are light beams, guidance bullets, and various other types. The CPU decides such type of bullet and its flight route in response to the program. Like this, various types of flight routes of bullets exist.

The player character 200A moves to any one of the four blocks in order to avoid being hit by the bullet fired from the enemy character 100A or to effectively attack the weak point of the enemy character 100A.

By providing rules as to the firing direction of the bullet, the bullet path, type of bullet, and firing timing etc., the player may understand these rules by playing the game and will be able to predict the likes of the bullet route. Based on this prediction, the player may select an area where the bullet will not reach and avert the player character in advance.

Figure 11:
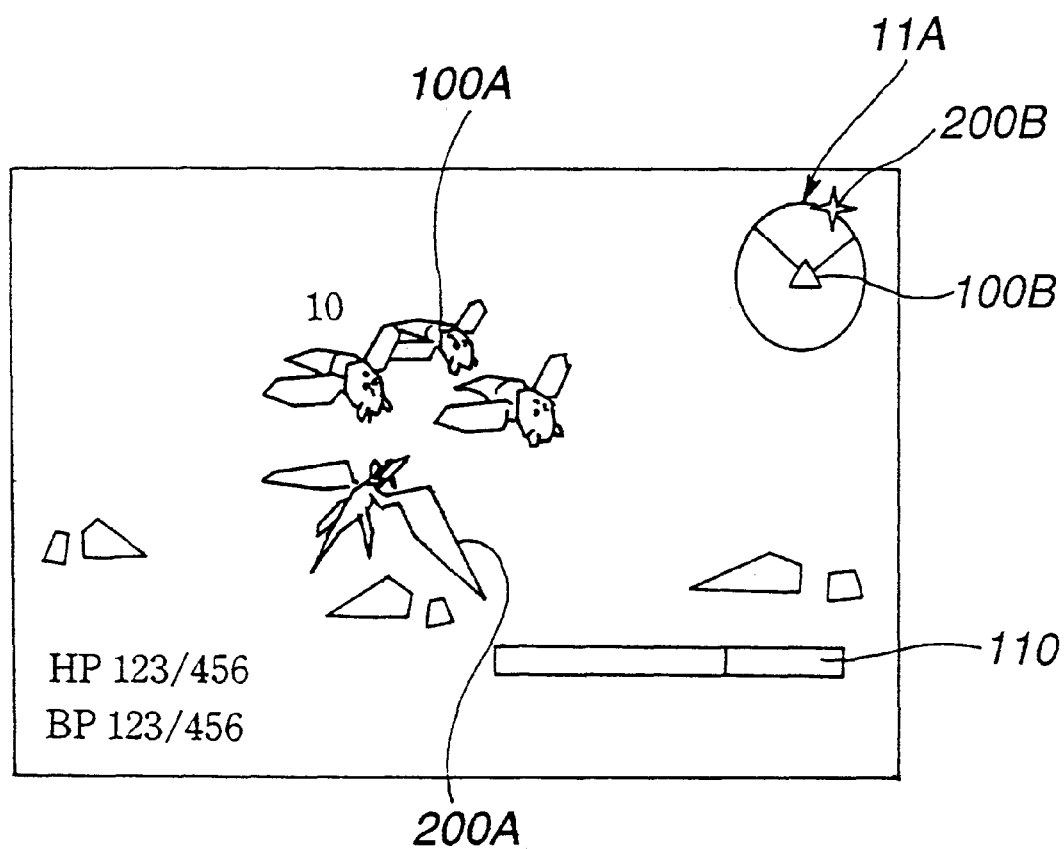
FIG. 11 is a battle screen displaying a virtual radar.

FIG. 11 shows a battle screen displaying a virtual radar 11A at the upper right portion of the screen. This virtual radar 11A is for clearly showing the player the position of the player character 200A against the enemy character 100A. On this virtual radar 11A, a symbol 200B of the player character 200A and a symbol 100B of the enemy character 100A are displayed. Therefore, the relative position relationship between the enemy character 100A and player character 200A may be known by this virtual radar 11A.

As it is clear from the virtual radar in FIG. 11, the player character 200A is placed in a block that is in front of the enemy character 100A. In such case, by differentiating the color of the block in which the symbol 200B of the player character 200A exists wish the background image, the player will be able to know the position relationship between the player character 200A and the enemy character 100A at a glance.

In FIG. 11, numeral 110 is a gauge for showing the player that the player character 200A is in an attacking condition. By this gauge reaching the maximum value, the player is able to use a desired weapon and make the player character 200A attack the enemy character 100A. The present invention provides a characteristic processing in relation to this gauge. This point will be explained hereafter.

Moreover, the numerical value "10" in the vicinity of the enemy character 100A displays the damage of the enemy character 100A. HP is called a hit point and expresses the remaining life of the player character with the numerical value of the numerator over the denominator. The numerator is the present remaining HP and the denominator is the maximum HP. Furthermore, BP is called a berserk point and shows points of the remaining strength for the player character 200A to produce techniques against the enemy character 100A. A technique is, for example, equivalent to magic or a deathblow in the program.

Regarding the movement form of bullets, there exists a plurality of forms such as the bullet being fired in order from front, back, left and right, or being fired in a timing of the changes of certain movements (vibrations or alterations) or forms (size, shape, color) of the enemy character 100A. Here, a bullet is equivalent to a moving character according to the claims.

Figure 12:
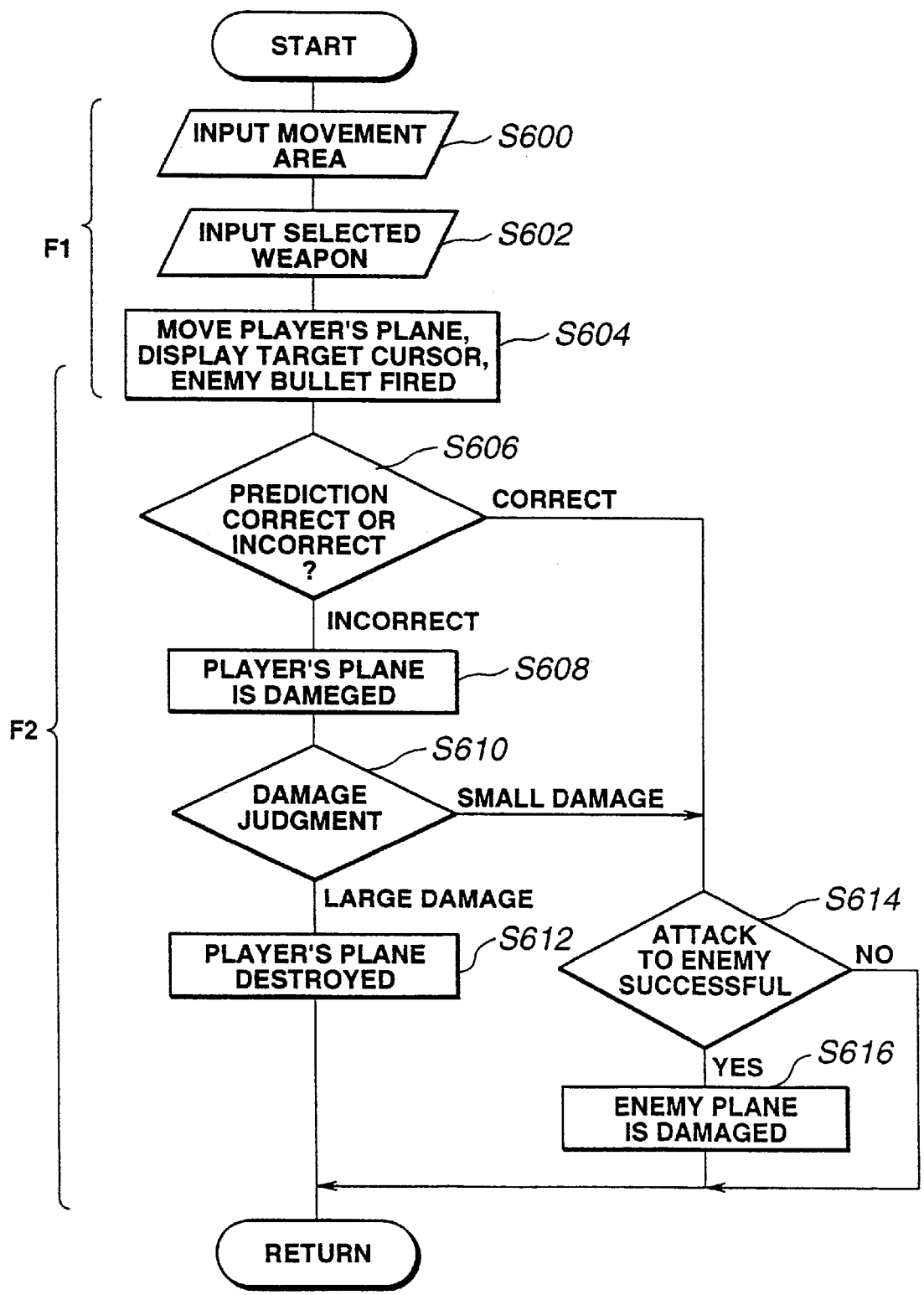
FIG. 12 is a flowchart of predicting processing of attacking.

FIG. 12 shows a flowchart for the CPU 101 to achieve predicting processing of attacks. This flowchart is structured of, and may be largely divided into, a phase F1 for selecting the movement area 202 of the player character 200A and the attacking weapon against the enemy character 100A and a phase F2 for determining the result of the attack between the player character 200A and enemy character 100A. These phases are repeatedly performed for every one interruption.

The result of the selection of the movement area is input to the game device by the player's operation of the pad 2b (S600). The player makes this selection by predicting the fired direction or timing of the enemy bullet, or the weak point of the enemy character 100A. According to this input result, the CPU places the player character in the selected block.

Next, in S602, the player selects a weapon. According to the type of weapon which was selected, a target cursor displayed toward the enemy character 100A is displayed on the screen as will be explained hereafter. In such case, the form of the cursor may be changed according to the type of weapon that was selected.

For example, as to be shown in FIG. 18 hereafter, the shape or size of the displayed target cursor may be changed according to the type/power of the selected weapon. In such case, to show that the power is stronger if it is closer to the target cursor, the cursor may be changed to such shapes as (1) a large square, (2) a small square, (3) a large circle, (4) multiple squares, or (5) multiple circles. By placing the enemy character 100A within this target cursor and pulling the trigger, the attack against the enemy character 100A will be successful. The attack is achieved by operating a certain button of the pad 2b.

In S604, the player character 200A is mapped within one of the selected blocks (c.f. FIG. 8) according to the result of the selected movement area 202, a target is displayed according to the type of weapon that was selected, and a image of a bullet fired from the enemy character 100A is formed.

Here, the movement form of bullets such as the firing direction or type of bullet is decided among the various types by the CPU 101 according to the application software. The CPU 101 may be designed to automatically move the player character 200A in the selected movement area. Moreover, the player may move the player character 200A to the movement area 202 by the direction key of the pad 2b.

Next, in step 606, it is determined whether this prediction was correct or incorrect. That is, in the same step, the contact between the bullet and the player character 200A will be judged (judgment of the overlap of coordinates in the virtual space) negative if the prediction was correct and positive if the prediction was incorrect.

If the prediction was incorrect, the damaged amount toward the player character 200A is added in S608. If the damage of the player character 200A exceeds a certain value, the player character 200A is eliminated and a new player character 200A appears (S610 and S612), and proceeds to S614 if the damage is less than a certain value.

S614 is a step that is selected when the result of the prediction was correct in S606. In S614, by a method of contact judgment, it is judged as to whether or not the attack from the player character 200A to the enemy character 100A was successful. When this judgment is affirmed, damage adding processing is performed to the enemy character 100A, and processing such as damaging the enemy character 100A, eliminating the enemy character 100A, or making a new enemy character 100A appear is performed (S616).

On the other hand, if the judgment is denied in S614, it skips S616 and returns. Moreover, if the damage judgment of the player character 200A in S610 is less than a certain value, it proceeds to S614.

Moving means and deciding means according to the claims are realized by S604. Predicting means according to the claims is realized by S600. Character position setting means according to the claims is realized by S604. Controlling means for displaying processing according to the claims is realized at the steps on and after S606.

In this embodiment, an example of the firing of bullets by the enemy character being controlled by the CPU of the game device was explained; however, it may also be controlled via the pad 2b by the other player (the opponent). In such case, the movement form of bullets may be selected randomly at the opponent's will, and thereby, the player must predict the opponent's will to control the destination of the player character.

According to the game device shown in this embodiment, if the player predicts the bullet firing form of the enemy character 100A and operates the pad 2b according to such prediction, the player may move the player character 200A to a certain position. If operated well, the bullet may be avoided. Therefore, even within a virtual three-dimensional space, the player character 200A may be easily controlled in order to avoid the bullets and the like.

If the movement area 202 is selected, a certain flag is set for each block and temporarily stored in the RAM and the CPU is able to map the player character 200A to a corresponding block by looking at such flag. Furthermore, by the player moving the player character 200A up, down, left or right within the movement area 202, the bullet fired from the enemy character 100A toward the player character 200A may be avoided.

The above was the explanation of changing the form of the cursor according to the selected weapon. Next, the case wherein selecting a return bullet (a return bullet to counter attack the enemy bullet) for defending the attack from the enemy character 100A is explained.

FIG. 13 is a diagram wherein the enemy character 100A is firing bullets toward the player character 200A. In this diagram, the player character 200A is positioned in front of and facing the enemy character 100A. FIG. 13(1) is the plan view of this condition and FIG. 13(2) is the side view. The route of these bullets may take a plurality of forms.

Toward the player character 200A, there are the likes of a straight bullet aiming at the top of the player character 200A, a straight bullet aiming at the bottom, a curve bullet directed from the top toward the bottom, a curve bullet directed from the bottom toward the top, a curve bullet curving from the right toward the left, and a curve bullet directed from the left to the right, etc.

The player character 200A fires an own return bullet to eliminate the enemy bullet before reaching the player character 200A so that the bullet from the enemy character 100A does not hit the player character 200A. In this second embodiment, such game image is displayed on the game screen.

Figure 14:
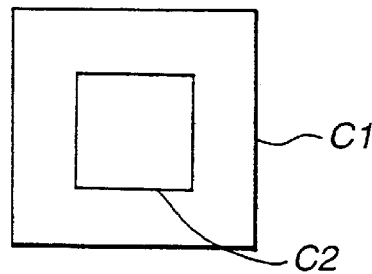
FIG. 14 shows a cursor to be displayed on the screen for the player character to counter attack.

On the game screen, an image from the viewpoint of the virtual camera of the player character 200A facing the enemy character 100A is displayed. FIG. 14 shows the shape of the cursor for counter attacking from the side of the player character 200A to be displayed on the game screen. This cursor is a double display of C1 and C2.

If the player adjusts and moves this cursor to the enemy bullet and operates the pad 2b, the return bullet is fired toward the position adjusted by the cursor. If the cursor is adjusted to the enemy bullet and the firing timing of the return bullet is appropriate, an image of the enemy bullet being eliminated by the return bullet is simulated.

If the cursor cannot be adjusted to the enemy bullet, this counter attack is judged as a failure. As the movement of the enemy bullet is fast, it is usually difficult to adjust and move the cursor to the enemy bullet. The key is to predict the course of the enemy bullet and the type of enemy bullet in advance and set the position of the cursor according to the result of such prediction. This point will be explained hereafter.

If the enemy bullet is captured by the cursor C1, destruction of the enemy bullet is possible, and especially if it is captured by the cursor C2, the destruction of the enemy bullet will be achieved with more certainty. The cursor C2 is displayed in roughly a certain size in the center of C1. Moreover, this cursor is also a character according to the claims.

Figure 15:
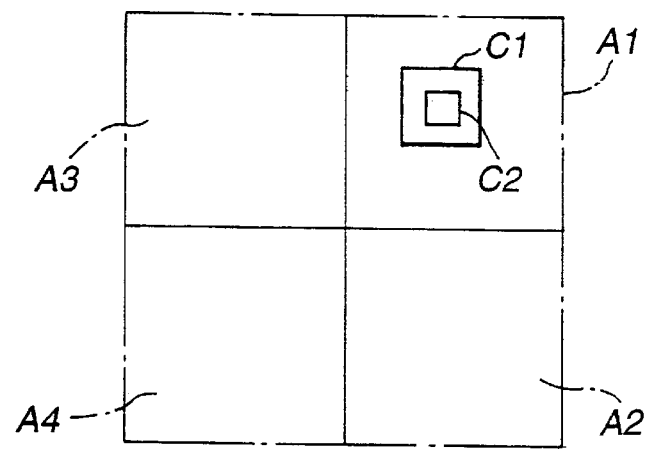
FIG. 15 shows the movement range of the cursor with a one-point chain line.

FIG. 15 is a diagram showing the movement range of the cursor with one-point chain lines. A1 through A4 show the range of the cursor setting position. Seen from the player, A1 is to the upper right, A2 is to the lower right, A3 is to the upper left and A4 is to the lower left. The player predicts the passing position (passing course) of the enemy bullet before the enemy bullet is fired, and sets the cursor destination to either one of A1 through A4.

That is, the cursor position is adjusted to put the enemy bullet within the cursor C2. For example, if the prediction is correct, it should be easy to put the enemy bullet within the cursor C1. On the other hand, the above will be difficult if the prediction is incorrect. If the prediction is incorrect, for example, and the cursor is moved from the position of A1 to the position of A4 to put the enemy bullet within the cursor, it will be difficult to make the cursor follow the enemy bullet which is moving at a high speed because the moving distance of the cursor is far. If the cursor cannot be adjusted to the enemy bullet, the player character 200A will be damaged by such enemy bullet.

Next, the significance of the cursor C2 will be explained. Even if the flight route of the enemy bullet coincided with the prediction, if the type of bullet is different, the form in which the enemy bullet passes within the cursor C1 will differ. For example, although it would be easy to put the enemy bullet within the cursor C2 if the enemy bullet is a straight bullet, if the enemy bullet was a curve bullet, it may be possible to put the enemy bullet within the cursor C1 but difficult to put it within the cursor C2. Therefore, if it is a curve bullet, the player may compete to eliminate the bullet with certainty by carefully adjusting the cursor so that the enemy bullet is put within the cursor C2. Nonetheless, this cursor C2 may be omitted.

Figure 16:
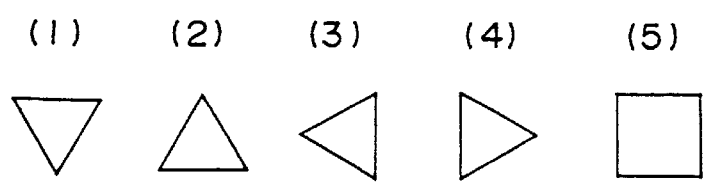
FIG. 16 shows examples of the shapes of a cursor.

FIG. 16 shows an example of the forms of the cursor C2. The player predicts whether the enemy bullet is a straight bullet or a curve bullet. If predicted to be a curve bullet, the flight path of the curve bullet is further predicted. The form of the cursor C2 is set according to the results of such prediction. The cursor shown in FIG. 16(5) is the cursor when the player predicts a straight bullet. All four sides of this cursor are the same width. Of course, the square may be changed to a circle. The form of the cursor C1 may also be made to be the same.

FIG. 16(1) shows a cursor C2 for corresponding to a curve bullet curving from the bottom toward the top as seen from the player (i.e. seen from the virtual camera on the side of the enemy character 100A of the player character 200A shown in FIG. 7). Similarly, the following are the respective cursor C2s corresponding to the curve bullet: FIG. 16(2) is from top to bottom, FIG. 16(3) is from left to right, and FIG. 16(4) is from right to left.

If the cursor is widened in the direction of the curve, the enemy bullet may be more effectively put in the cursor C2 when the prediction of the curve of the enemy bullet was correct, and thereby, the enemy bullet may be eliminated with certainty.

Figure 17:
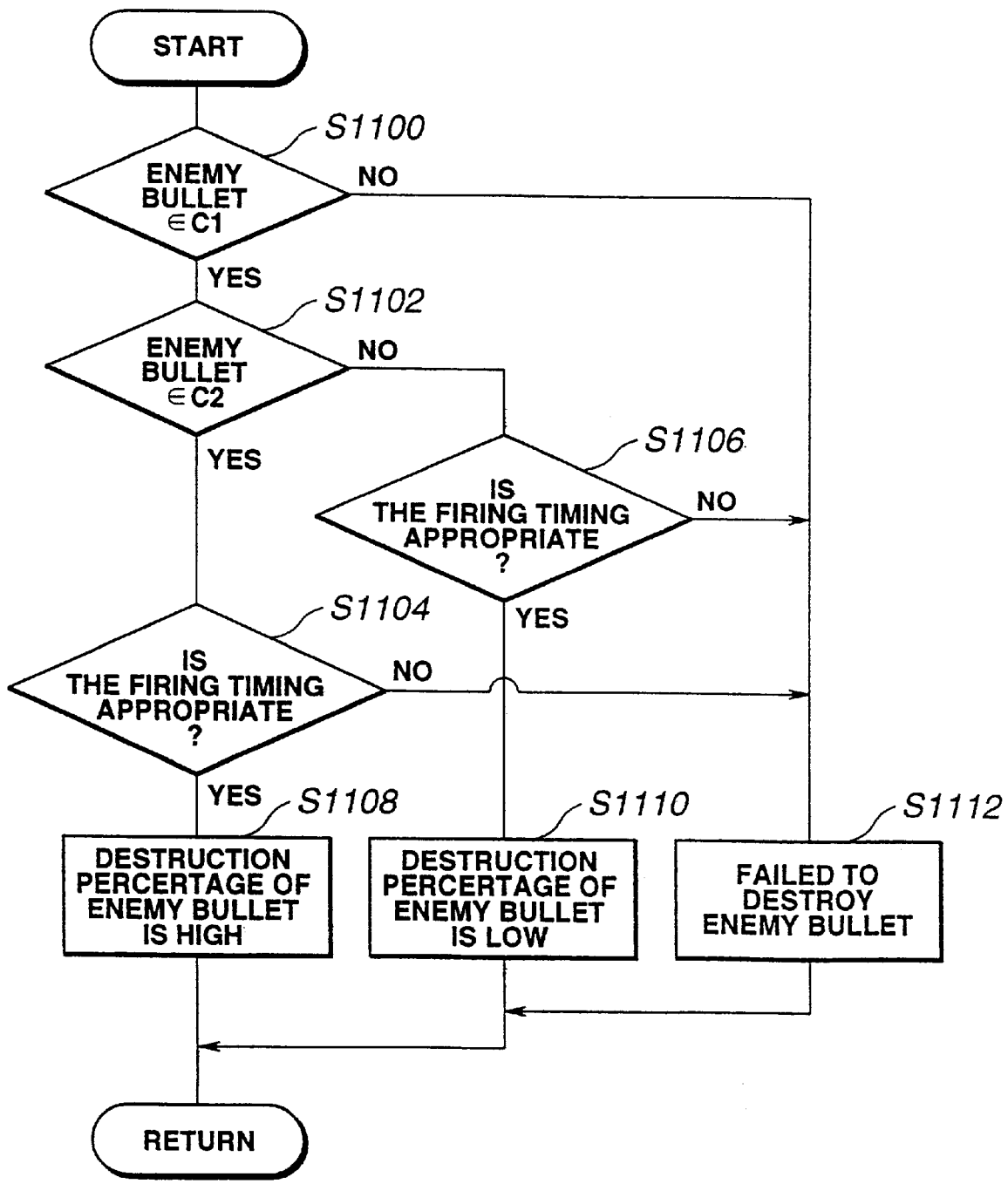
FIG. 17 is a flowchart of deciding processing of the overlap between the cursor and the enemy bullet.

FIG. 17 is a flowchart of judging processing of the overlap of the cursor and the enemy bullet. At S1100, it is judged as to whether or not the enemy bullet was captured within the cursor C1. At S1102, it is further judged as to whether or not the enemy bullet was captured within the cursor C2. At S1104 and S1106, it is judged as to whether the firing timing of the return bullet was appropriate.

If the firing timing at S1104 was appropriate, an image of the enemy bullet being eliminated is generated at S108. The probability of the enemy bullet being eliminated at this time is high. The same image is generated when the judgment is affirmed at S1106. The probability of the enemy bullet being eliminated at this time is lower than that of S1108.

If the judgment of S1104 and S1106 is denied, the counter attack will be judged as a failure and the enemy bullet will not be eliminated (S1112). If no counter attack is made from the player side, the judgment of S1104 and S1106 will also be denied. Moreover, if the enemy bullet could not be captured within the cursor C1 at S1100, it will also be judged as the enemy bullet not being eliminated.

In this embodiment, as the flight route etc. of the enemy bullet is predicted and a certain position of the cursor (target) for counter attacking is set according to the result of such prediction, a similar effect as embodiment 1 may be achieved.

Furthermore, in the phase F1 of selecting the area and weapon of FIG. 12, since the attacking direction, type, or characteristic of the enemy bullet is unknown, a game strategy from a new perspective of predicting the characteristic of the enemy bullet separately from, or together with the area selection and preparing for such bullet may be produced. In such case, the enemy bullet is a moving character that moves on the game screen.

Moreover, according to the above mentioned embodiment, by providing time to correspond to the prediction of the enemy attack and the player predicting the action of the enemy within such time and deciding such prediction by one's own experience, the strategy of the game will be diversified.

In addition, the shape of the cursor may further be changed according to the type of return bullet from the player character 200A. Thereby, an effective return bullet may be predicted for eliminating the enemy bullet. Since this prediction factor is added, the game will be diversified and a high level game environment may be constructed.

In the phase F1 of FIG. 12, the CPU will not accept the input of bullet firing etc. from the player and only the reproduction of results of the selection of the movement area and weapon at S600 through S604 is performed by the CPU.

Figure 19:
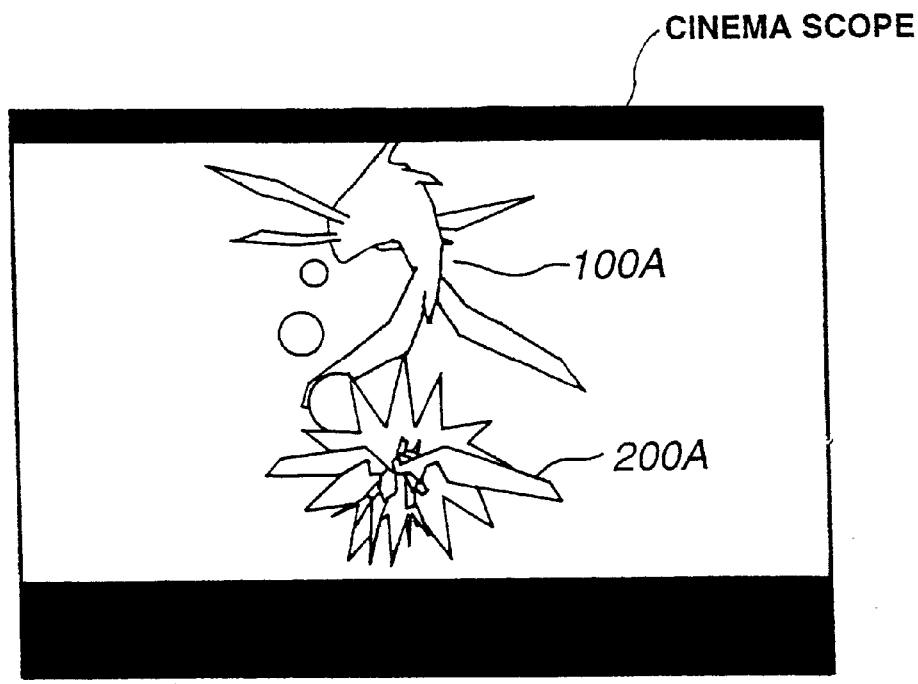
FIG. 19 is an explanatory diagram showing the situation of the cinema-scope being displayed on the game screen.

Accordingly, as it is clear from the characteristic of a role-playing game, during this phase, the player will know that input is not possible from the player's side by displaying, for example, a cinema scope (trademark). FIG. 19 shows the situation where the cinema scope is displayed on the screen. This cinema scope functions as notification means for showing the player that input by the pad 2b is not possible.

The cinema scope shown in FIG. 19 is also information communicating means for stopping the progress of the clock in a real-time battle scene, and for informing the player that it is not possible to input to make the player character 200A perform techniques or attack the enemy character 100A. According to the screen of the cinema scope, the player is able to know that it is not possible to input for a certain period of time from the real-time battle scene. For example, FIG. 19 is an image of the enemy character 100A attacking the player character 200A in which processing of the player character being hit is performed. While this image is displayed, the progress of the time is stopped, and is made so that the attack from the player character may not be performed for a fixed time.

The cinema scope shown in FIG. 19 limits the image displayed on the game screen to a certain field on the TV monitor, for example, within a rectangular frame. At such time, an image of the game screen is not displayed outside of the rectangular frame, and for example, black wallpaper is displayed. Regarding the color of this wallpaper, the wallpaper of the cinema scope when the player side is attacking may be set to a blue color, and the wallpaper of the cinema scope when the enemy side is attacking may be set to a red color. Like this, by changing the color of the wallpaper of the cinema scope, the player will know whether the condition of not being able to input is due to the player's own attack or due to the enemy attack. However, the color of the wallpaper of the cinema scope is not limited to the above example, and may be of any color as long as the condition of not being able to attack due to either the player or the enemy may be distinguished.

Moreover, other than the display of the cinema scope shown in FIG. 19 as to limit the image of the game screen to a rectangular field on the TV monitor, it may also be limited to such as an oval field, an oblong field, or a circular field. In addition, an adequate narration or the player's lines may be displayed on the wallpaper according to the progress of the game.

Furthermore, in a role-playing game, the player side move and the enemy side move exist. Therefore, the steps such as "phase F1 on the player character side" and "phase F2 on the player character side," "phase F1 on the opponents side," "phase F2 on the opponents side," "phase F1 on the player character side" etc., the flowchart of FIG. 12 may be divided into the steps of the player character side and the enemy side.

Furthermore, "prediction" as used in the present specification is of course the player or the opponent's will, but if the game device is the player character side and the player is the enemy character side, it will be the prediction of the game device. Moreover, "prediction" includes, for example, when a player has a positive will for avoiding the enemy attack (above movement between the blocks of the movement area), has a positive will for eliminating the enemy attack (counter attacking the enemy bullet), or when the character position and cursor position are appropriately decided, and as a result, the attack made by the enemy character was able to be avoided.

Figure 20:
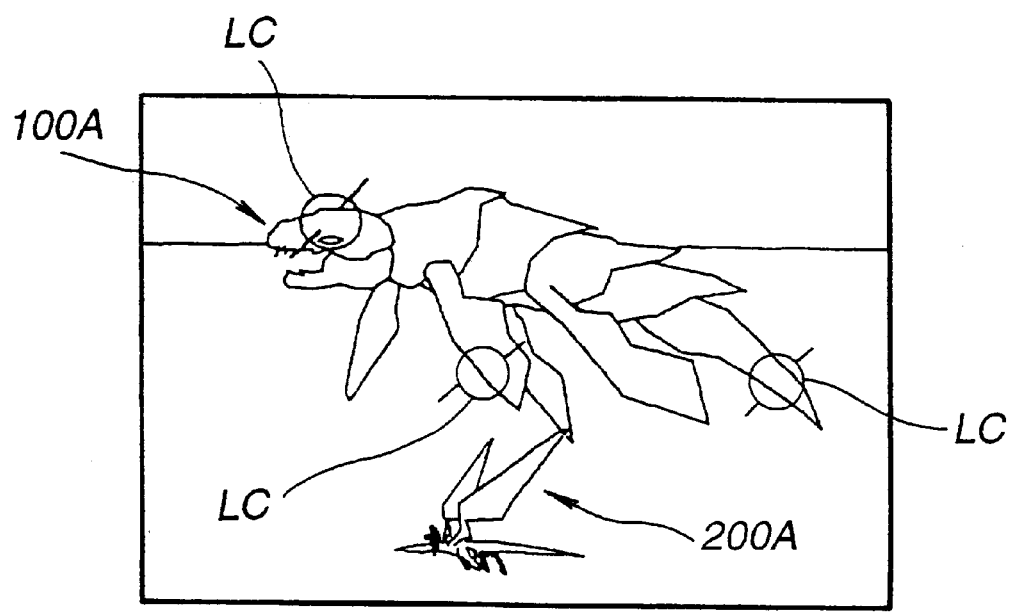
FIG. 20 is an explanatory diagram showing the lock-on situation of the cursor in a battle scene.

Next, characteristic workings of the game device in battle scenes will be explained. FIG. 20 is a model diagram (an image from a battle scene) for explaining such characteristic workings. The part where the player character 200A can attack the enemy character 100A is defined as the collision point, and the player character 200A attacks the enemy character 100A by locking on the publicly known lock-on cursor LC to such collision point in a shooting game.

Collision used herein shall mean the contact (coincidence or overlapping of both coordinates) between a character in a game program, such as a bullet or light beam, and the enemy character 100A or player character 200A, and collision point shall mean the point where the collision occurred or should occur. As shown in FIG. 21, this collision point is set at, for example, a total of four points on the enemy character; the front, back, left and right (C1 through C4), and the lock-on cursor locks on in order from the closest collision point as seen from the player character 200A. Among the collision points seen from the player character 200A and collision points of the enemy character 100A, locking on to the collision points on the player character 200A's side, that is, those within the view range of the virtual camera, or the collision points able to be seen from the player is possible. Such collision points able to be locked on will be hereinafter referred to as an "on-collision point." On the other hand, collision points unable to be seen from the player character 200A, that is, those on the opposite side of the player character 200A will be hereinafter referred to as an "off-collision point."

This point will be explained with FIG. 21(3) as an example. Collision points other than the tail of the enemy character 100A (C1, C2 and C4) may be locked on by the cursor. In other words, on-collision points. In addition, as the collision point C3 may not be seen from the player, it is an off-collision point. Moreover, FIG. 20 shows the condition of the cursor being locked on to the collision point.

The lock-on function of the cursor will be explained below with reference to FIG. 22. At S22.2, it is decided as to which block among front, back, left and right of the cylindrical movement area 202 the player character 200A is positioned. Next, the collision point to be on or off from the position of the block wherein the player character 200A exists is decided (S22.4), and from the coordinate data of the collision point to be on, the distance of the on-collision point to the player character 200A is decided (S22.6).

Thereafter, a flag "1" showing that the cursor has been locked on to the collision point closest to the player character 200A is set (S22.8). Then, according to the flags, it is judged as to whether or not all of the lock-on cursors have been locked on (S22.10). Next, it is judged as to whether the flags have been set for every collision point (S22.12).

If the lock-on number has reached a maximum value at S22.10, it proceeds to S22.14, and it is judged as to whether or not the player has turned the bullet firing button on of the pad 2b. If the lock-on number did not reach the maximum value at S22.10 and all of the collision points are not locked on at S22.12, it proceeds to S22.16, decides the collision points that are not set, and sets up a flag to the closest collision point among these collision points.

When all collision points have been locked on at S22.12, it proceeds to S22.14 and is judged as to whether or not the bullet firing button of the pad 2b has been turned on. If the bullet firing button of the pad 2b has been turned on at S22.14, the image of the attack scene with virtual guided missiles and light beam bullets scattering from the player character 200A toward the lock-on cursor which was locked on to the collision point of the enemy character 100A is synthesized and displayed on the monitor (S22.18). On the other hand, if the player does not turn the bullet firing button on of the pad 2b within a certain time, it skips S22.18 and returns.

According to the processing of the above flowchart, only the collision point on the player character 200A's side among the collision points of the enemy character 100A, or the collision point close to the player character 200A's side may be attacked. Therefore, the likes of being able to attack collision points that cannot be seen from the player may be prevented.

Furthermore, in order to make the player's attack more diversified, a plurality of collision points are set on the front, back, left and right of the enemy character 100A. If the enemy character 100A is structured of a plurality of objects (head, body, tail, etc.), a collision point may be set for each object.

Regarding the collision points, "weight" may be added for each collision point. For example, a collision point of a certain point may be set as the collision point equivalent to the weak point of the enemy character 100A. If the attack to this collision point is successful, much damage may be given to the enemy character 100A. Here, the shape or color of the cursor may be changed in accordance with the difference of the weight of the collision points.

This collision point may be of a still type in which the position and weight are fixed in advance, or of a movable type in which the position and weight changes. In other words, according to the playing time or the game score, the collision point may be eliminated according to the points of the player character 200 or enemy character 200A, the position of the collision points may be changed, or the weight of the collision may be changed. If a plurality of enemy characters 100A exist as in FIG. 11, it is preferable that a collision point be set for each character 100A. If there are more lock-on cursors than the collision points, a plurality of lock-on cursors may be overlapped on a certain collision point.

Figure 23:
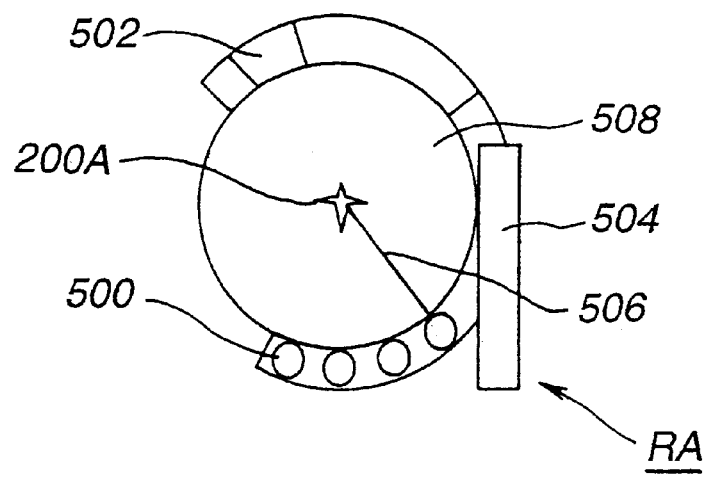
FIG. 23 is a diagram showing a second example of the virtual radar.
Figure 24:
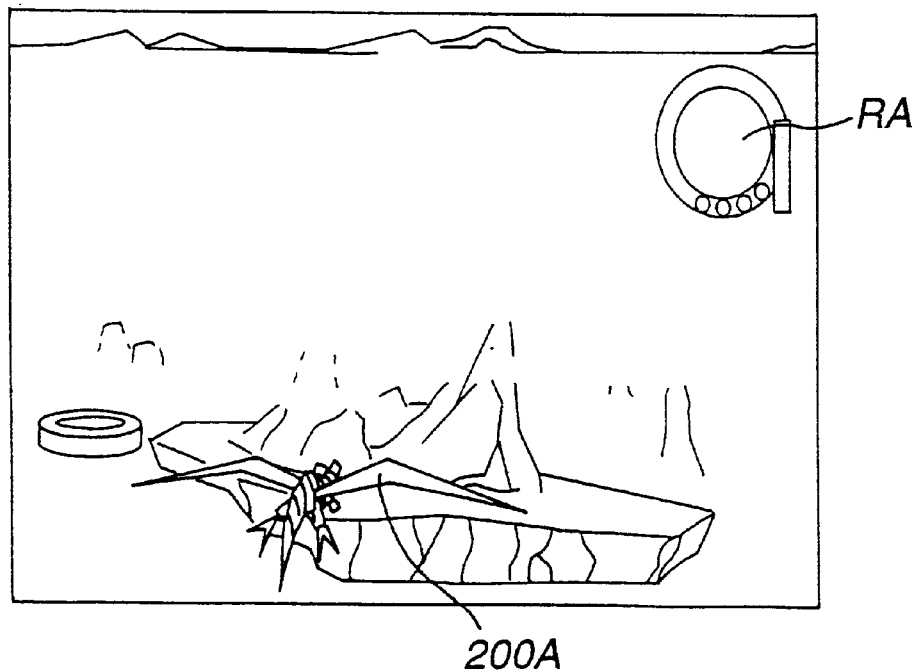
FIG. 24 is an example displaying this Virtual radar on a game screen.

FIG. 23 shows an example of the virtual radar shown in FIG. 11, and is in a form capable of displaying much information. FIG. 24 is an example displaying this virtual radar RA on the game screen. This virtual radar RA places the player character 200A in the center and arranges symbols for displaying various and diversified information around its circumference.

In FIG. 23, numeral 500 is a virtual gauge showing the flight speed when the player character 200A is flying within the virtual space. Numeral 502 shows the destination or the direction of the destination, and if this is kept roughly in the center, the player character 200A may be flown toward the destination. Moreover, numeral 504 shows the flight speed of the player character 200A against the virtual point above the sea. Furthermore, numeral 506 displays the northward direction of the map of the flight direction of the player character 200A. Numeral 508 is a field for displaying the probability or encounter percentage etc. of the player character 200A proceeding to the battle scene, and the above encounter percentage etc. are displayed by changing the color etc. of this field.

Moreover, a display of an enemy or an event point (city, save-point) may be added to the field of this numeral 508.

If the encounter percentage is high, there is a high probability that the player character 200A will proceed to a battle scene in the near future. The change of this encounter percentage may be communicated to the player by changing the form of the field 508, for example, such as by changing the color of the background. The encounter percentage differs by the flight position of the player character 200A. This virtual radar RA is mainly displayed on the screen during the processing of a role-playing game program. While monitoring the encounter percentage, the player must appropriately judge as to whether the encounter with the enemy character is desired or the encounter with the enemy character 100A should be avoided and make the player character 200A detour to the destination, and operate the player character 200A accordingly.

The attack from the player character 200A to the enemy character 100A is possible when the capacity of the weapon gauge 110 (c.f. FIG. 11) is full. Conventionally, there were the types in which a plurality of gauges were provided therewith for each type of weapon as the above weapon gauge, but the present invention is characterized in that these were unified.

Figure 36:
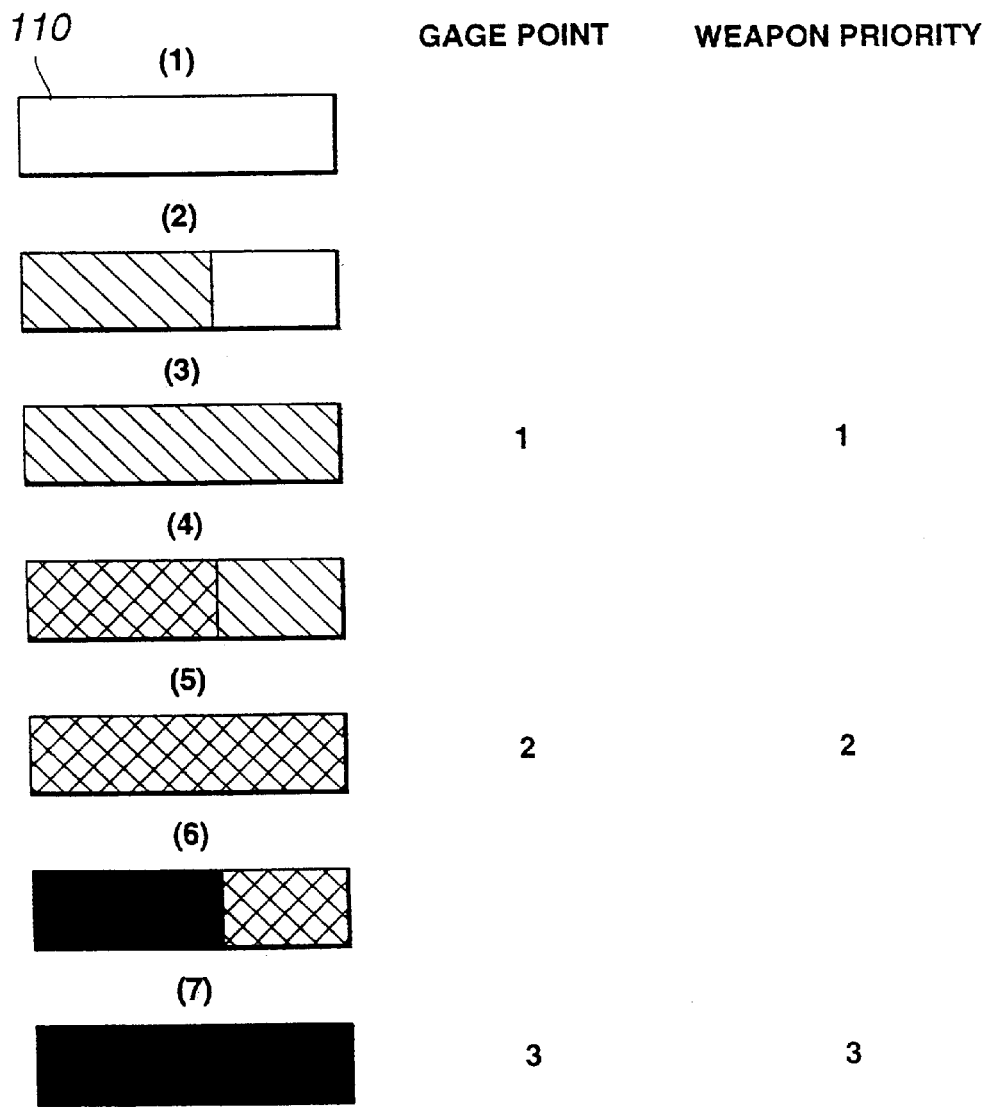
FIG. 36 is a timing diagram showing the steps of the virtual energy being filled in a weapon gauge.

FIG. 36 shows the process of the weapon gauge 110 being filled with virtual energy according to the lapse in time, so it will progress from FIG. 36(1) to FIG. 36(7). First, in the process of FIG. 36(1) through FIG. 36(3), the first energy of a certain color is replenished in a white gauge. If the color is inverted up to the right end, energy replenishment to the weapon gauge 110 is completed. Next, a different colored second energy is filled with the process of FIGS. 36(4) through 36(5). Moreover, a different colored third energy is filled with the process of FIGS. 36(6) through 36(7). In FIGS. 36(3), 36(4) and 36(5) in which respective energy is filled therein, the gauge point is respectively set to 1, 2 and 3, and for each gauge point, weapon priority 1, 2 and 3 are provided respectively thereto.

Higher the weapon priority, the player character 200A can use higher level techniques and weapons against the enemy character 100A, or if the same weapon, may use such weapon a numerous number of times.

The player will know the techniques and weapons that can be selected by recognizing the process of the color of the weapon gauge 110 being inverted. The number and type of weapon and technique to be used is decided according to the gauge point when the player turns on the firing button of the pad 2b.

For example, if the gauge point is "3," the same weapon may be continuously fired three times when desired by the player. Compared to the conventional cases wherein only one attack could be selected each time the gauge was filled, the mode for the player attacking has increased, thereby enabling the player to prepare for situations of having to kill many enemy characters 100A in a short period of time.

Even in the middle of the gauge being filled, the player may move the player character 200A. In addition, bullets may be fired. When the firing button of the pad 2b is turned on by the player, the CPU obtains the weapon priority from the gauge point of such time, selects the weapon in accordance thereof and attacks the enemy character 100A.

After the firing button is turned on, the gauge point is reduced according to the amount of bullets fired. For example, if one gauge point worth of weapon is used when the weapon gauge point 110 is at FIG. 36(4), it returns to the condition of FIG. 36(2). Moreover, if from the condition of FIG. 36(6) and one gauge point worth of weapon is used, it returns to FIG. 36(4), and if two gauge points worth, it returns to the condition of FIG. 36(2).

Virtual energy is successively replenished to the weapon gauge 110 in certain intervals. Even if the gauge point is reduced, energy is successively replenished to the weapon gauge 110. However, as the gauge point 3 of FIG. 36(7) is of a maximum value, there will be no further increase of points.

By unifying the conventional plurality of gauges, there is an effect of the player being relieved from the trouble of constantly checking the plurality of gauges in selecting the weapon against the enemy character 100A. Furthermore, the function of the weapon gauge 110 is not limited to selecting weapons, but may also be used for selecting the actions of the player character 200A or enemy character 100A etc. in which different images are synthesized for each point of the weapon gauge 110, or made to implement different simulations etc.

Figure 37:
FIG. 37 is an example of such weapon gauge.

FIG. 37 shows a different mode of the weapon gauge. In this weapon gauge, the color of each block is successively inverted from left to right, and the gauge point is 1 if the color of the left end block is inverted, the gauge point is 2 if the color of the middle block is also inverted, and the gauge point is 3 if the color of the left end block is further inverted.

In the RAM 102, a certain recording field is provided therein to record this gauge point. One gauge point is decreased at a time when the weapon is used, and one gauge point is increased when a certain time is lapsed, and each respective result is stored therein. If a weapon firing command exceeding the gauge point is input into the CPU 101, the CPU 101 ignores such command and fires the weapon in response to the command input after the gauge point is filled.

Moreover, there is no need to limit the recolor of the gauge to three times. In addition, if a plurality of player characters 200A exist, other than weapons and actions, a character may also be selected.

Next, a different example of a movement area set around the enemy character 100A will be explained. Here, instead of the cylindrical movement area mentioned above, the field being of a cubic shape is the characteristic point. The player character 200A is placed on at least one face of this cube. Moreover, the player character 200A is placed on a certain face and the enemy character 100A is placed on a different face.

Figure 25:
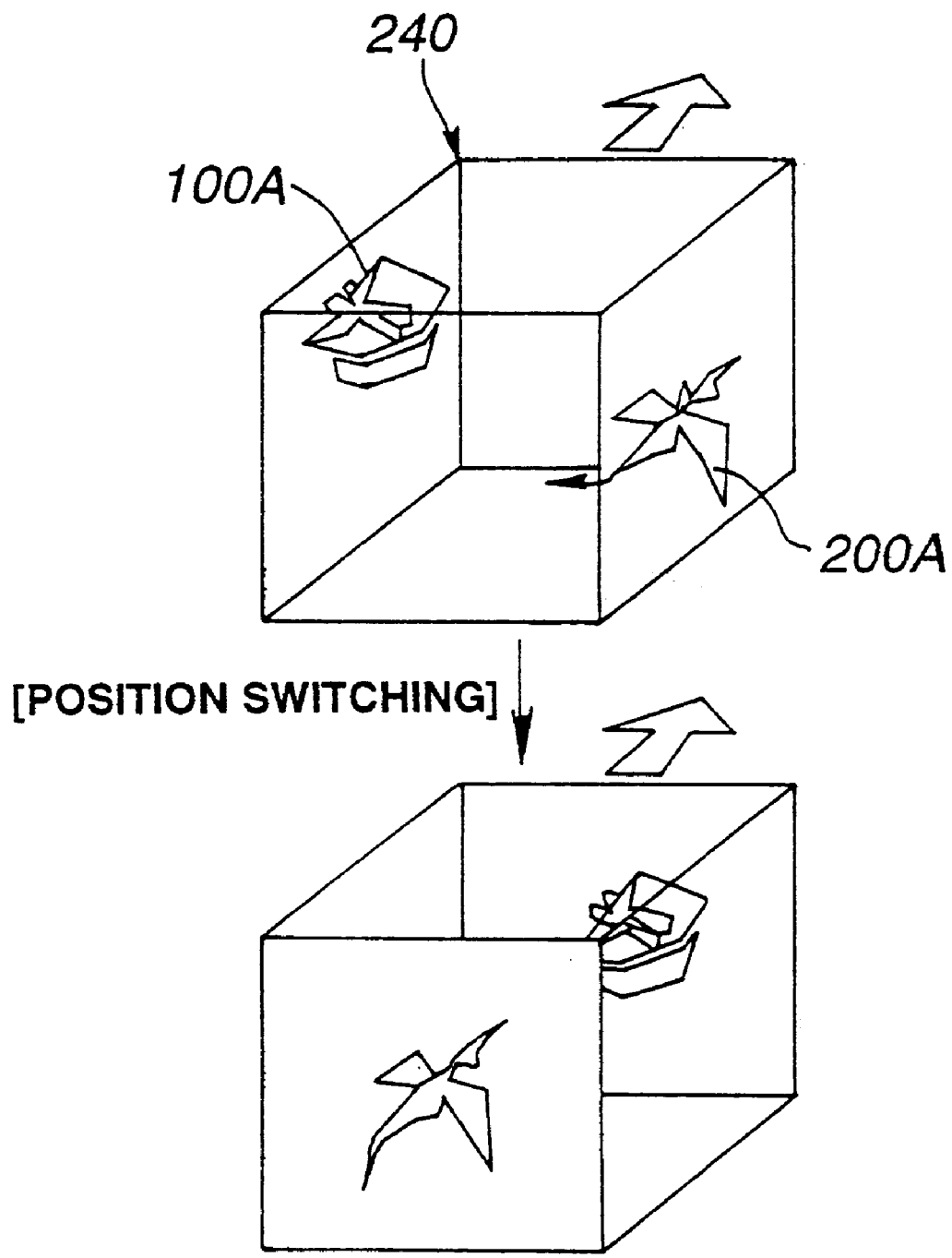
FIG. 25 is a diagram showing the situation in which the enemy character and player character are placed in a movement area of a right hexahedral body.

FIG. 25 shows an example of a cubic shaped movement area. The enemy character 100A is placed on one face of the movement area 240 and the player character 200A is placed on the face opposite to such face. The enemy character 100A and player character 200A may move on the other four faces (surfaces).

Figure 26:
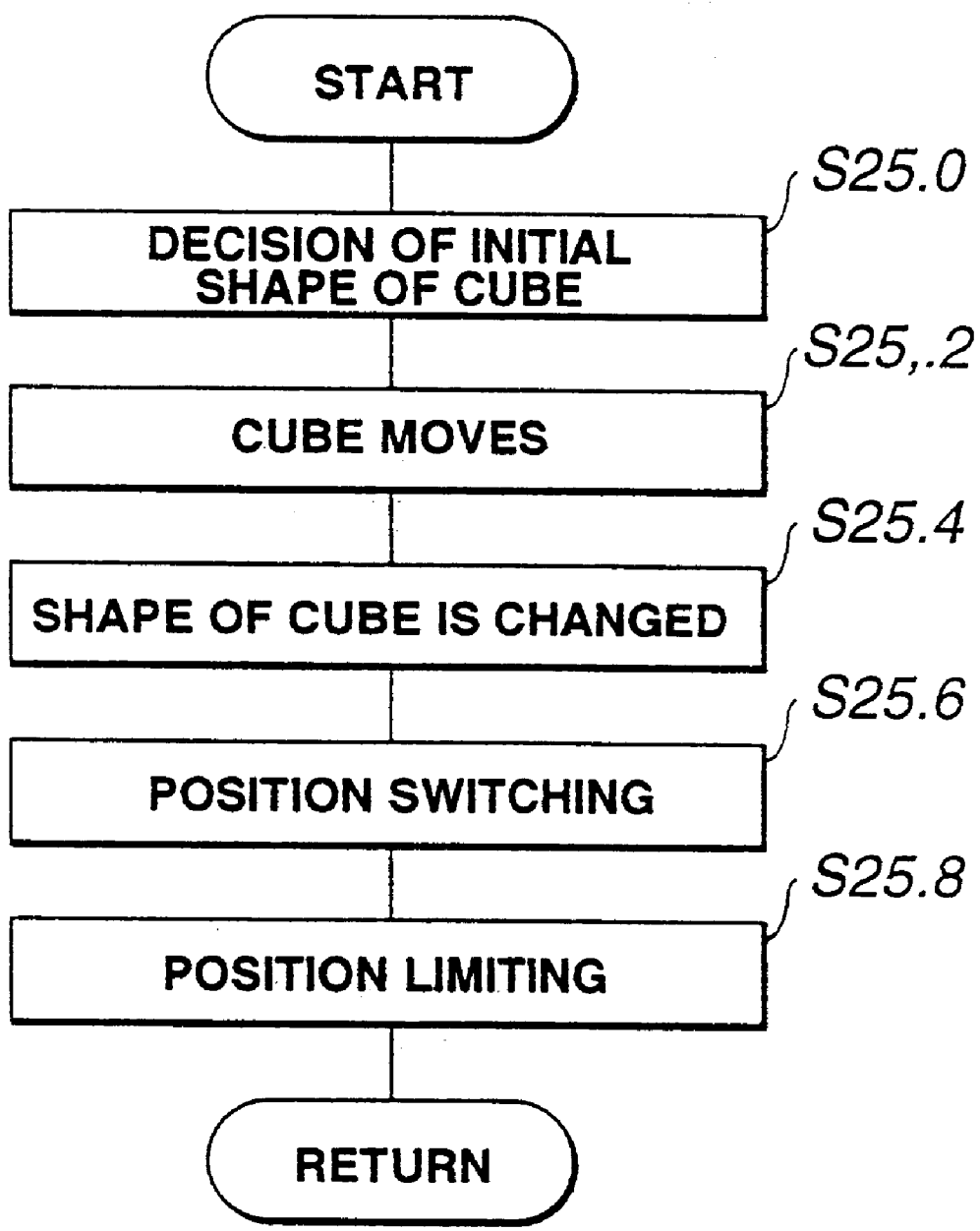
FIG. 26 is a flowchart for placing the enemy character and player character in a movement area of a right hexahedral body.

FIG. 26 shows the flowchart for placing the player character 200A or enemy character 100A in the movement area 240. In S25.0, the initial form of the cube is decided when proceeding to the battle scene of FIG. 3. The initial form of the cube is mainly decided based on the distance between the enemy character 100A and player character 200A. Larger the distance between the two, larger the cube is set.

Figure 27:
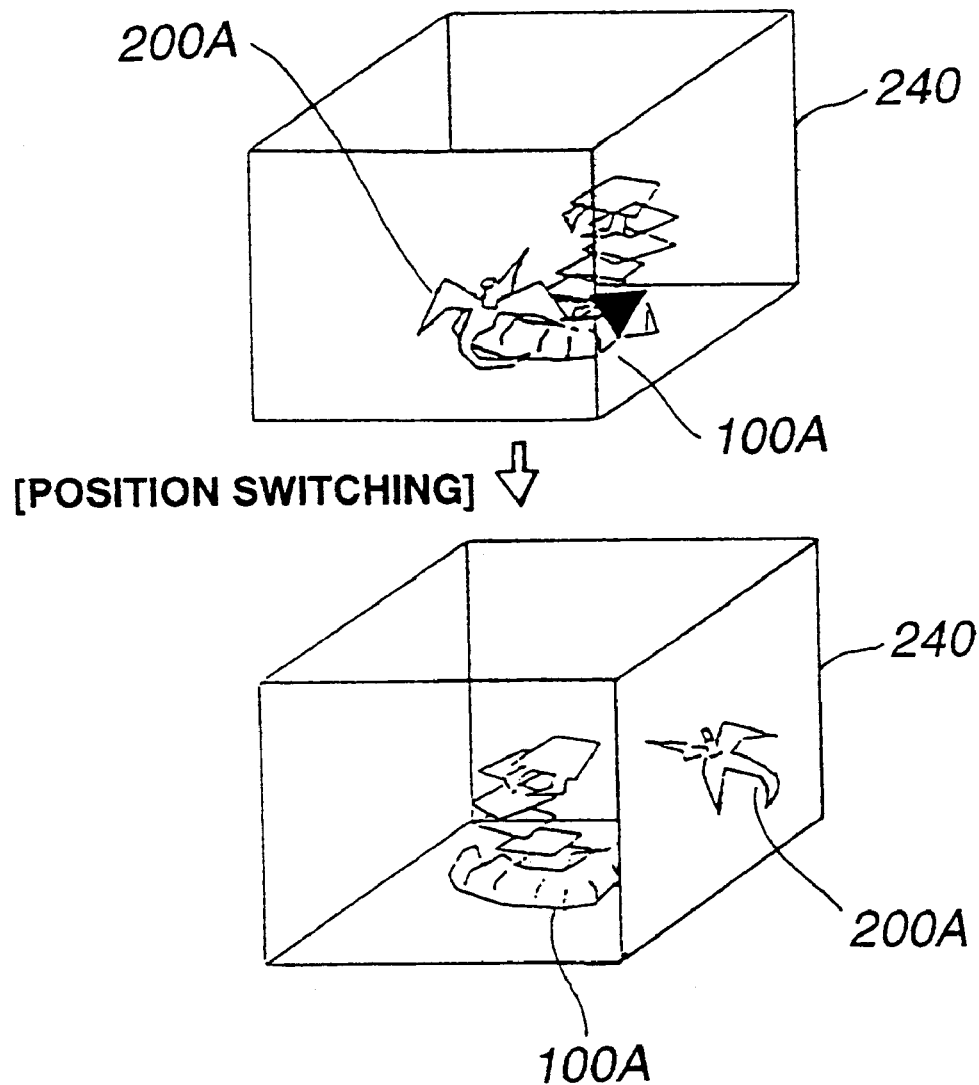
FIG. 27 is a diagram showing the enemy character being placed at the bottom center of the right hexahedral body and the player character being placed on the face of one side.

Various patterns may be considered for placing the enemy characters 100A on each of the faces of the cube. Like the cylindrical movement area 202 mentioned above, FIG. 27 shows the condition wherein the enemy character 100A is placed on the bottom face of the cube and the player character 200A is placed on one side of the cube. Here, the enemy character 100A may be placed in the central position of the cube.

In the battle scene explained in FIG. 3, the player character 200A and enemy character 100A perform position taking in order for the player character 200A to take an advantageous position against the enemy character 100A. Thereby, this position taking will be explained based on the flowchart shown in FIG. 26. At S25.5, processing for advancing the cube at a certain speed through a world coordinate system as the virtual three-dimensional space is performed. As mentioned above, this cube shall also move along the path 16A (c.f. FIG. 3). In other words, the position of the cube is amended in correspondence to the movement of the player character 200A and enemy character 100A.

Figure 28:
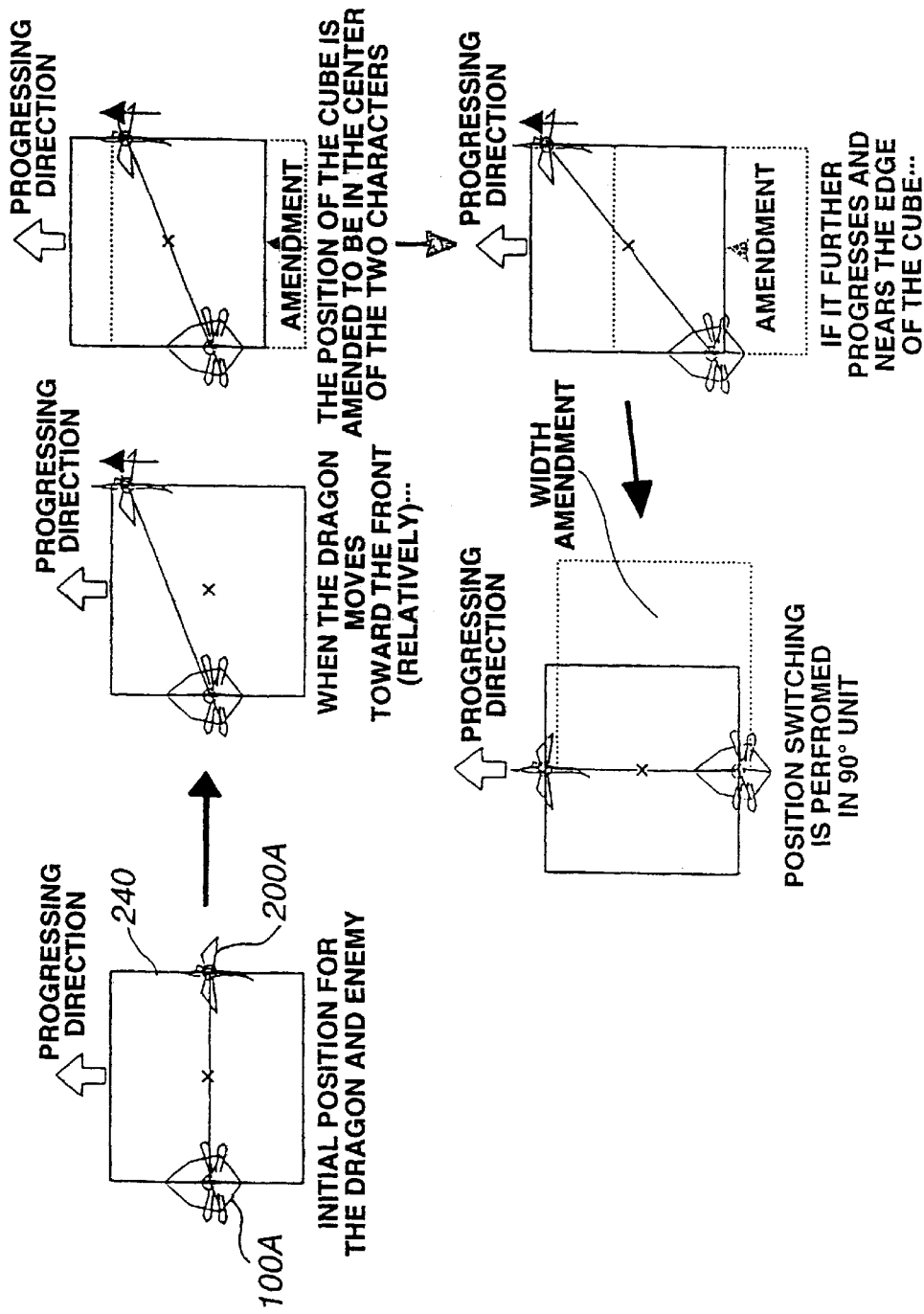
FIG. 28 is a diagram explaining the position taking between the enemy character and player character.

FIG. 28 is for explaining this processing. From a condition wherein the player character 200A and enemy character 100A are flying while maintaining a certain distance, if the player character 200A (the dragon in FIG. 28) progresses toward the direction in which the enemy character 100A (the enemy in FIG. 28) is progressing, the entire position of the cube is amended so that the center of the cube will become the center of the line connecting the dragon and the enemy. The dotted lines in FIG. 28 show the position of the cube prior to the amendment and the solid lines show the position of the cube which was amended according the relative displacement of the dragon and the enemy.

Figure 29:
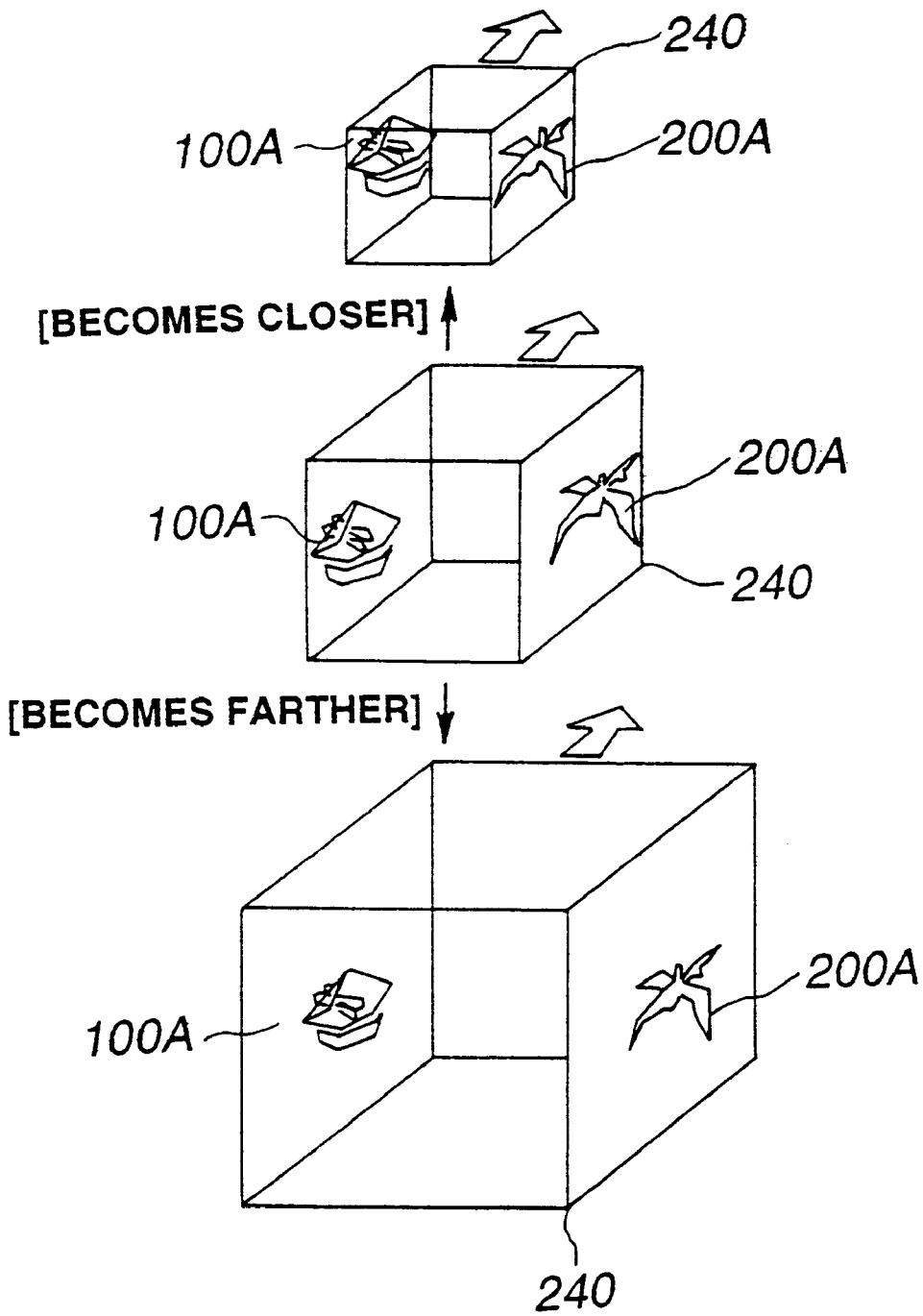
FIG. 29 is a diagram for explaining the state in which the movement area of the right hexahedral body is transformed pursuant to the relative position relationship between the enemy character and player character.

The shape of the cube may be modified according to needs (FIG. 26:S25.4). If the modification of a cube is necessary, the initial condition of the form of the cube may be changed according to the distance between the player character 200A and enemy character 100A. FIG. 29 shows the modification of the cube according to the distance between the two characters. If the player character 200A and enemy character 100A are comparatively distant, the shape of the cube is changed so that each of the sides composing the cube becomes longer. Furthermore, if the distance between the two characters becomes closer, the shape of the cube is changed so that each of the sides composing the cube becomes shorter.

Figure 30:
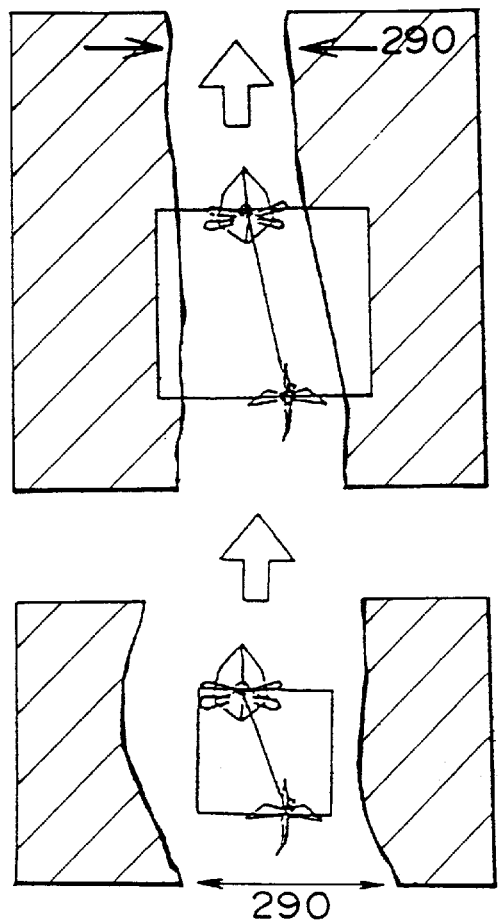
FIG. 30 is a diagram showing an example of transformation of the movement area when the player character and enemy character passes through a narrow path.

In the second modification example of the cube, the length of each of the sides composing the cube is changed according to the route taken by the cube. FIG. 30 shows the case when the width 290 of the route taken by the cube it narrow and the length of each of the sides composing the cube is shortened. In this case, the collision judgment of the cube and route 290 is checked, and if such collision judgment is affirmed, the length of the sides of the cube is gradually decreased in a certain value until this collision judgment is denied.

Next, it proceeds to the position switching step (FIG. 26:S25.6) of the enemy character 100A and player character 200A. In this step, as shown in FIG. 28, when the player character 200A and enemy character 100A nears the coordinates of the corner of the cube, a flag for position changing is set, and the CPU 101 performs processing of moving the player character 200A to the center of one side composing the cube and further moving the enemy character 100A to the center of the side opposite to such side. Here, the distance between the player character 200A and enemy character 100A is amended. The cube progresses without performing position changing until the player character 200A and enemy character 100A near the corner of the cube.

Moreover, this position switching is performed among the four faces as mentioned above, but may further include the top and bottom faces as well. If position switching is to be performed with the top and bottom faces of the cube, the enemy character 100A and player character 200A move to these top and bottom faces as well. Since this system is of a virtual camera filming such scenes from the back of the player character 200A and enemy character 100A, the image of the player character 200A and enemy character 100A may reflect like a mirror if such characters are to be moved to the top and bottom faces.

Figure 31:
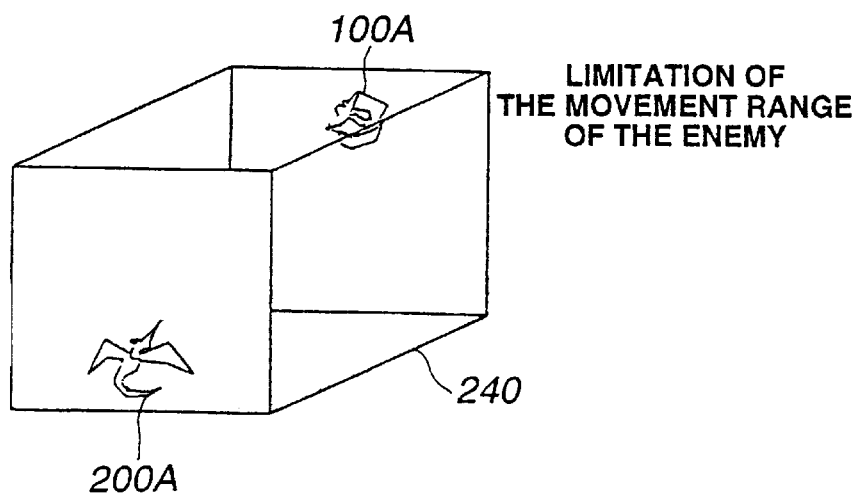
FIG. 31 is a diagram showing an example of controlling the movement range of the play character.
Figure 32:
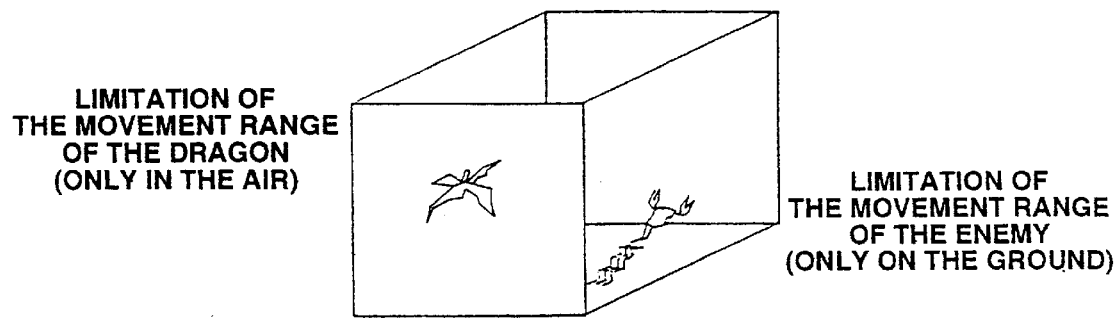
FIGS. 32 and 33 are diagrams in which the player character is placed near the top surface and the enemy character is placed near the bottom surface of the movement area of the right hexahedral body.
Figure 33:
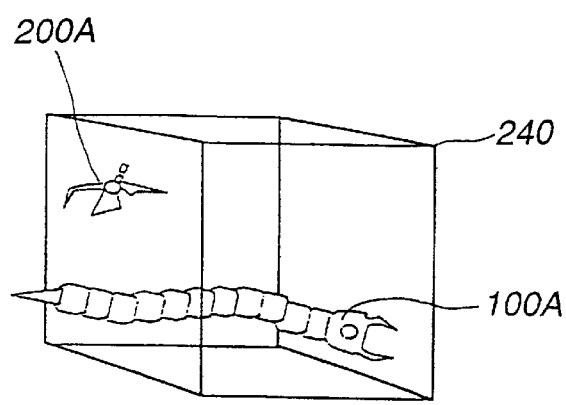

If the position of the player character 200A or enemy character 100A in the cube needs to be limited at S25.8, as shown in FIG. 31 for example, the movement range of the player character 200A shall be moved toward the bottom face and the movement range of the enemy character shall be moved toward the top face. In addition, as shown in FIGS. 32 and 33, the player character 200A is moved toward the top face and the enemy character 100A is to be moved toward the bottom face. When the above is performed, for example, and the total length of the enemy character 100A is longer compared to the total length of the player character 200A (FIG. 33), the two characters will not cross each other.

The limitation of the movement range of the player character 200A and enemy character 100A is performed by designating the respective movable coordinate values. This kind of limitation may also be applied to the cylindrical movement area. At such time, the length of the major axis and minor axis may be freely set. By limiting the length of the upward direction of the cylinder, the flight range of the player character 200A may be limited. Therefore, the player may easily control the player character 200A or the game development (the spatial relationship etc. between the enemy character 100A and player character 200A) may be diversified.

Although the above-mentioned embodiment was explained in regard to a game device for simulating battle (shooting) between the player character 200A and enemy character 100A, the type of game program is not limited if the present invention can be applied thereto. For example, the prediction working may also be adapted to a goalkeeper trying to stop the ball kicked by the opponent during a penalty kick in a soccer game. Moreover, it may also be applied to a fighting game that is a battle game other than shooting.

Furthermore, the explanation of collision does not only have to be regarding battle, but may also be applied to games such as command role-playing games.

Furthermore, although the aforesaid embodiment explained the case in which the movement of the player character or the cursor is automatically moved to a certain field, according to the present invention, the player himself may move the above to a certain field in advance.

Furthermore, the point to set the character does not have to be separate for each block, but may also be, for example, a certain point (a specific point of space coordinates). That is, a point, field or position determined in advance. This point is obtained by being defined in the space coordinate system or the screen coordinate system. Moreover, the present invention may also be applied to a sprite game based on a two dimensional coordinate system.

As the storage medium for storing the working program for the game device, other than the cartridge ROM and CD-ROM, it may also be an internet or a communication medium on a personal computer network.

Furthermore, the destination of the above moving character may be divided into a plurality of fields.

Furthermore, as the movement area, other than the cylindrical or cubic shape, a polygon or a spherical shape may be used.

Furthermore, in the above embodiment, although encounter was explained as information to proceed to the processing mode of a battle (upper conception of shooting), it may also be of a game program of action fighting games, gathering information of a city in a game program, or drama with story development etc.

Furthermore, regarding the weighting of the lock-on cursor, if there are a plurality of enemy characters or if the virtual objects are of different types, the collision point does not have to be set for each character. The lock-on cursor may change according to the type of character, for example, so as to display a weighted cursor on an enemy that is advantageous to kill first. In other words, a plurality of weighted cursors are set to the lock-on cursor in the present invention, and is able to display the weighted cursor according to the type or number of enemy characters.

What is claimed is:

1. An image processing device comprising:
   means for placing virtual objects in a virtual space formed within a computer system and proceeding a game while controlling the movement of said virtual objects according to input operations and predetermined rules;
   image displaying means for displaying the state within said virtual space as a screen seen from a certain viewpoint; and
   means for setting a movement field of a certain shape surrounding at least one of said virtual objects and limiting a movement range of other virtual objects to only a boundary portion said movement field.

2. An image processing device according to claim 1, wherein said virtual objects are an enemy character and a player character in a game program, and said image processing device further comprising means for setting said movement field around the enemy character and placing the player character on the surface of this movement field.

3. An image processing device according to claim 1, wherein said movement field is formed of a cylindrical or hexahedral shape.

4. An image processing device comprising:
   means for controlling the actions of a plurality of virtual objects placed within a virtual space formed within a computer system;
   image displaying means for displaying the virtual objects as an image from a certain viewpoint on a screen;
   first processing means for controlling the actions of said virtual objects based on a software of a role-playing game;
   second processing means for setting a movement field of a certain shape around at least one of said virtual objects and performing a shooting game program while limiting a movement range of other virtual objects to only a boundary portion of said movement field;
   third processing means for outputting encounter information when a certain event occurs during processing of said first means; and
   fourth processing means for obtaining this encounter information to make action controlling processing of said virtual objects proceed from said first processing means to said second processing means.

5. An image processing device according to claim 4, wherein said movement field is formed of a cylindrical or hexahedral shape.

6. An image processing device according to claim 4 comprising screen displaying means for displaying an image including the virtual objects operated by a player from a certain viewpoint within a virtual space, wherein said screen displaying means displays a virtual radar for showing the relative position relationship between a virtual object operated by the player and other virtual objects.

7. An image processing device comprising:
   means for placing virtual objects in a virtual space formed within a computer system and proceeding with a game while controlling the movement of said virtual objects according to input operations and the predetermined rules;
   image displaying means for displaying the state within said virtual space as a screen seen from a certain viewpoint; and
   means for alternately switching between a role-playing game and a shooting game and performing processing, which enables a player to set a movement field having a certain shape surrounding at least one of said virtual objects at one's discretion during processing of a role-playing game program and limits a movement range of other virtual objects to only a boundary portion of said movement field during processing of a shooting game program.

8. An image processing method comprising the steps of:
   placing virtual objects in a virtual space formed within a computer system and proceeding a game while controlling the movement of said virtual objects according to input operations and predetermined rules;
   displaying an image of the state within said virtual space as a screen seen from a certain viewpoint; and
   setting a movement field of a certain shape surrounding at least one of said virtual objects and limiting the movement range of other virtual objects to only a boundary portion of the movement field.

9. The image processing method according to claim 8, wherein said virtual objects are an enemy character and a player character in a game program, and said method further comprises the step of setting said movement field around the enemy character and placing the player character on the surface of this movement field.

10. The image processing method according to claim 8, wherein said movement field is formed of a cylindrical or hexahedral shape, said step of setting a movement field includes the step of setting a movement field of a cylindrical or hexahedral shape surrounding at least one of said virtual objects and limiting the movement range of other virtual objects based on the surface of the movement field.

11. An image processing method comprising the steps of:
   controlling the actions of a plurality of virtual objects placed within a virtual space formed within a computer system;
   displaying an image of the virtual objects as an image from a certain viewpoint on a screen;
   controlling the actions of said virtual objects based on a software of a role-playing game;
   setting a movement field of a certain shape around at least one of said virtual objects and performing a shooting game program while limiting a movement range of other virtual objects to only a boundary portion of said movement field;
   outputting encounter information when a certain event occurs during the step of controlling the action of said virtual objects; and obtaining this encounter information to make action controlling processing of said virtual object proceed from the step of controlling the actions of said virtual objects to the step of setting the movement field of the certain shape.

12. The image processing method according to claim 11, wherein said movement field is formed of a cylindrical or hexahedral shape, and wherein the step of setting a movement field includes the step of setting a movement field of a cylindrical or hexahedral shape around at least one of said virtual objects and performing a shooting game program while limiting the movement range of other virtual objects based on this movement field.

13. The image processing method according to claim 11 further including the step of displaying an image including the virtual objects operated by a player from a certain viewpoint within a virtual space, wherein said screen displaying means displays a virtual radar for showing the relative position relationship between a virtual object operated by the player and other virtual objects.

14. An image processing method comprising:

placing virtual objects in a virtual space formed within a computer system and proceeding with a game while controlling the movement of said virtual objects according to input operations and the predetermined rules;

displaying an image of the state within said virtual space as a screen seen from a certain viewpoint; and alternately switching between a role-playing game and a shooting game and performing processing, which enables a player to set a movement field of a certain shape surrounding at least one of said virtual objects at one's discretion during processing of a role-playing game program and limits a movement range of other virtual objects to only a boundary portion of said movement field during processing of a shooting game program.

* * * * *